(12) United States Patent
Okayama et al.

(10) Patent No.: US 7,499,631 B2
(45) Date of Patent: Mar. 3, 2009

(54) DATA STREAM FORMAT CONVERSION METHOD AND RECORDING METHOD FOR THE SAME

(75) Inventors: Mutsuyuki Okayama, Kyoto (JP); Hirofumi Nakagaki, Kadoma (JP); Masaki Ito, Moriguchi (JP)

(73) Assignee: Panasonic Corporation, Kadoma (JP)

( * ) Notice: Subject to any disclaimer, the term of this patent is extended or adjusted under 35 U.S.C. 154(b) by 811 days.

(21) Appl. No.: 10/539,244

(22) PCT Filed: Dec. 18, 2003

(86) PCT No.: PCT/JP03/16285

§ 371 (c)(1), (2), (4) Date: Jun. 16, 2005

(87) PCT Pub. No.: WO2004/057869

PCT Pub. Date: Aug. 7, 2004

(65) Prior Publication Data

US 2006/0098960 A1 May 11, 2006

(30) Foreign Application Priority Data

Dec. 20, 2002 (JP) .............................. 2002-370313

(51) Int. Cl.
*H04N 5/91* (2006.01)
*H04N 7/01* (2006.01)
(52) U.S. Cl. ........................................ 386/131; 386/65
(58) Field of Classification Search ................... 386/46, 386/65, 131; 370/535; 341/67
See application file for complete search history.

(56) References Cited

U.S. PATENT DOCUMENTS 4,841,524 A * 6/1989 Miyaou et al. .............. 370/535

(Continued)

FOREIGN PATENT DOCUMENTS

EP 1195767 A1 * 4/2002

(Continued)

OTHER PUBLICATIONS

International Search Report for corresponding PCT/JP2003/016285, mailed Apr. 6, 2004.

*Primary Examiner*—Thai Tran
*Assistant Examiner*—Hung Q Dang
(74) *Attorney, Agent, or Firm*—Renner, Otto, Boisselle & Sklar, LLP

(57) ABSTRACT

A method for converting a data stream in a first format into a data stream in a second format is provided. Each stream includes data packs in which video/audio data are stored and a control pack for use in a playback control of the stream. In the first format stream, address information, representing addresses of the data packs and not required while the stream is played back, is present and associated with the stream. In the second format stream, address information, representing addresses of the data packs and required while the stream is played back, is stored in the control pack. The method includes the steps of: acquiring the first format stream and its associated address information; generating a second control pack in the second format from a first control pack in the first format, the second control pack storing the address information acquired; and replacing the first control pack with the second control pack, thereby generating the second format stream from the first format stream.

17 Claims, 12 Drawing Sheets

U.S. PATENT DOCUMENTS 5,566,192 A * 10/1996 Moon .......................... 714/798
5,982,306 A * 11/1999 Nam ............................ 341/67
6,236,432 B1 * 5/2001 Lee ........................ 375/240.26

FOREIGN PATENT DOCUMENTS

| JP | 11-238362 A | 8/1999 |
| JP | 2002-101389 A | 4/2002 |
| JP | 2002-150713 | 5/2002 |
| JP | 2003-45161 A | 2/2003 |

* cited by examiner

FIG.9
(a)
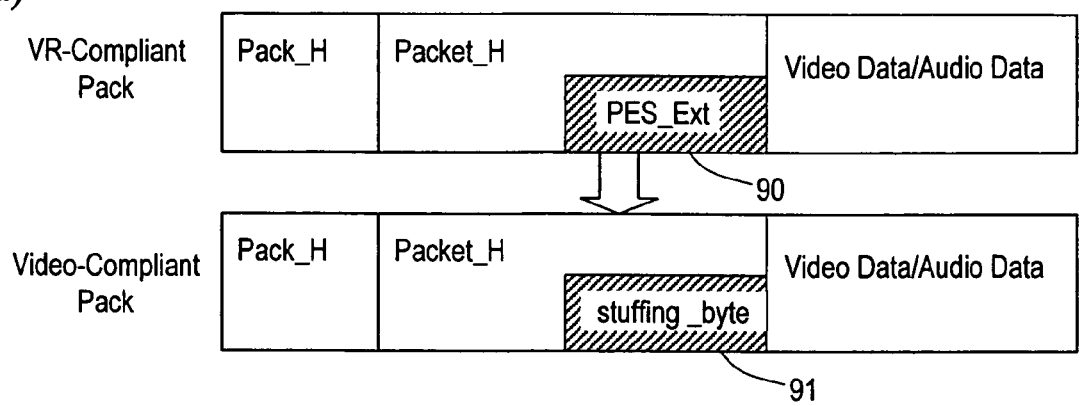
(b)
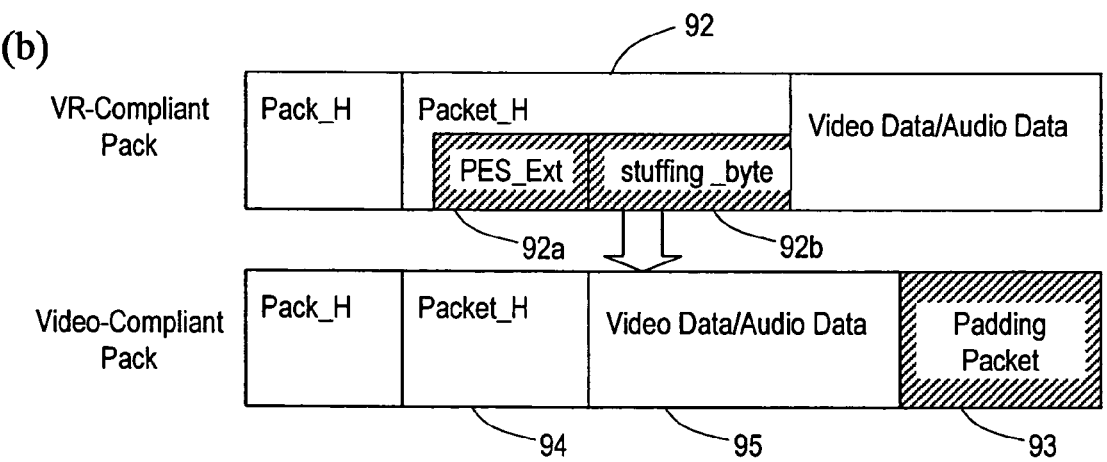
(c)
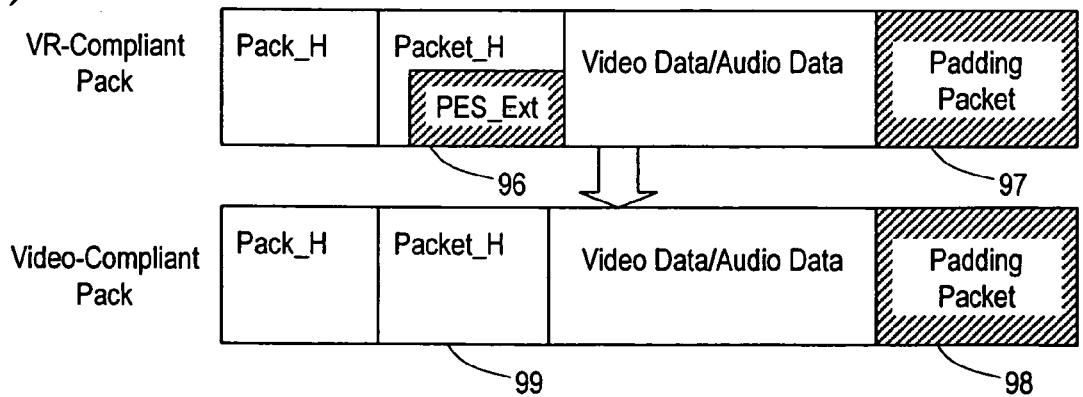

DATA STREAM FORMAT CONVERSION METHOD AND RECORDING METHOD FOR THE SAME

TECHNICAL FIELD

The present invention relates to the technology of converting the format of a content including video and audio. More particularly, the present invention relates to the technique of converting a content, which was recorded so as to comply with the DVD Video Recording standard, for example, into a content complying with the DVD Video standard.

BACKGROUND ART

In recent years, various standards for recording a content on a storage medium such as an optical disk have been defined. As for DVDs, for example, the DVD Video standard (which will be referred to herein as "Video standard") is defined as a recording format for a package medium to store a read-only content such as a movie thereon. Also, the DVD Video Recording standard (which will be referred to herein as "VR standard") is defined as a recording format for recording a content in real time and for making it editable afterward. A general read-only DVD player can play back a content that was recorded so as to comply the Video standard but cannot play back a content that was recorded so as to comply with the VR standard.

Currently, read-only DVD players are still far more popular than any other type of DVD player/recorder. Accordingly, there is a lot of need to convert a content that was recorded so as to comply with the VR standard into a content compliant with the Video standard. For example, if video and audio, which were recorded on a storage medium with a camcorder so as to comply with the VR standard, should be handed to some acquaintance that owns a read-only player, the video and audio recorded needs to be converted into a content compliant with the Video standard.

In the prior art, such a format conversion process is carried out by decoding once a content that was recorded so as to comply with the VR standard, converting the content into a digital baseband signal, and then encoding the signal again such that the signal complies with the Video standard.

Alternatively, as in the process disclosed in Japanese Patent Application Laid-Open Publication No. 2002-150713, the format conversion process may also be carried out by recording in advance the physical storage locations of respective data of a given content on a storage medium and the time stamps thereof and by making reference to these pieces of information.

However, in the conventional format conversion process in which a content is once decoded and then re-encoded, the intervening re-encoding process step requires the same amount of time to get the conversion done as the amount of time it takes to record the original content. In addition, the image quality of the content easily deteriorates, which is a problem.

Also, in the format conversion process to perform by reference to the pre-recorded physical storage locations and time stamps of the data, the physical storage locations need to be recalculated during the format conversion, thus requiring a relatively long conversion time, too.

DISCLOSURE OF INVENTION

An object of the present invention is to convert the format of a given content in a short time without deteriorating the image quality thereof.

A data stream conversion method according to the present invention can be used to convert a data stream in a first format into a data stream in a second format. Each data stream includes data packs in which video data and audio data are stored and a control pack for use in a playback control of the data stream. In the data stream in the first format, address information, which represents the addresses of the data packs and which is not required while the data stream is played back, is present and associated with the data stream. In the data stream in the second format, address information, which represents the addresses of the data packs and which is required while the data stream is played back, is stored in the control pack. The conversion method includes the steps of: acquiring the data stream in the first format and the associated address information thereof; generating a second control pack in the second format from a first control pack in the first format, the second control pack storing the address information acquired; and replacing the first control pack with the second control pack, thereby generating the data stream in the second format from the data stream in the first format.

The data stream in the first format may be an arrangement of multiple data units, each of the data units including a plurality of data packs and the first control pack. The method may further include the steps of: locating an extension field, which is included only in the first one of the data packs, in each of the second and following data units; and replacing data of the located extension field with predetermined stuffing data.

The method may further include the steps of: detecting a data length of a stuffing field, which is arranged after the extension field and in which the stuffing data is stored in advance; and determining whether or not the data length detected is a reference length or less. The step of replacing may be carried out if the data length is the reference length or less.

The data stream in the first format may be an arrangement of multiple data units, each of the data units including a plurality of data packs and the first control pack. Each data pack may include at least one packet in which either the video data or the audio data is stored. The method may further include the steps of: locating an extension field, which is included only in the first one of the data packs, in each of the second and following data units; detecting a data length of a stuffing field, which is arranged after the extension field and in which stuffing data is stored in advance; determining whether or not the data length detected is a reference length or less; deleting the extension field and the stuffing field if the data length is greater than the reference length; and adding a padding packet, of which a packet length corresponds to a combined field length of the extension and stuffing fields deleted, to the at least one packet.

The data stream in the first format may be an arrangement of multiple data units, each of the data units including a plurality of data packs and the first control pack. Each data pack may include a packet in which either the video data or the audio data is stored and a padding packet for adjusting a pack length of the data pack. The method may further include the steps of: locating an extension field, which is included only in the first one of the data packs, in each of the second and following data units; deleting the extension field; and adjusting the packet length of the padding packet according to the field length of the extension field deleted.

The address information may be stored in the first control pack of the data stream in the first format, and the step of acquiring the address information may include extracting the address information stored in the first control pack.

The step of acquiring the address information may include extracting the address information stored in an attribute information field, on which an arbitrary type of information is describable, within the first control pack.

The step of acquiring the address information may include extracting the address information stored in a data file separately from the data stream.

The address information may show a storage location of a data pack in which a picture representing the video is stored and a storage location of another data pack in which audio to be reproduced synchronously with the picture is stored.

The first data pack may be the first one of video packs including video data or that of audio packs including audio data.

A format conversion apparatus according to the present invention is used to convert a data stream in a first format into a data stream in a second format. Each data stream includes data packs in which video data and audio data are stored and a control pack for use in a playback control of the data stream. In the data stream in the first format, address information, which represents the addresses of the data packs and which is not required while the data stream is played back, is present and associated with the data stream. In the data stream in the second format, address information, which represents the addresses of the data packs and which is required while the data stream is played back, is stored in the control pack. The format conversion apparatus includes: a receiving section for acquiring the data stream in the first format and the associated address information thereof; and a pack generating section for generating a second control pack in the second format from a first control pack in the first format, the second control pack storing the address information acquired. The pack generating section replaces the first control pack with the second control pack, thereby generating the data stream in the second format from the data stream in the first format.

The data stream in the first format may be an arrangement of multiple data units, each of the data units including a plurality of data packs and the first control pack. The format conversion apparatus may further include: a decision section for locating an extension field, which is included only in the first one of the data packs, in each of the second and following data units; and a converting section for replacing data of the located extension field with predetermined stuffing data.

The decision section may detect a data length of a stuffing field, which is arranged after the extension field and in which the stuffing data is stored in advance, and may determine whether or not the data length detected is a reference length or less. If the data length is the reference length or less, the converting section may replace the data with the stuffing data.

The data stream in the first format may be an arrangement of multiple data units, each of the data units including a plurality of data packs and the first control pack. Each data pack may include at least one packet in which either the video data or the audio data is stored. The format conversion apparatus may further include: a decision section for locating an extension field, which is included only in the first one of the data packs, in each of the second and following data units, detecting a data length of a stuffing field, which is arranged after the extension field and in which stuffing data is stored in advance, and determining whether or not the data length detected is a reference length or less; a packet generating section for generating a padding packet; and a converting section for deleting the extension field and the stuffing field if the data length is greater than the reference length, adjusting the packet length of the padding packet according to the combined field length of the extension and stuffing fields deleted, and then adding the padding packet to the at least one packet.

The data stream in the first format may be an arrangement of multiple data units, each of the data units including a plurality of data packs and the first control pack. Each data pack may include a packet in which either the video data or the audio data is stored and a padding packet for adjusting a pack length of the data pack. The format conversion apparatus may further include: a decision section for locating an extension field, which is included only in the first one of the data packs, in each of the second and following data units; and a converting section for deleting the extension field and adjusting a packet length of the padding packet according to the field length of the extension field deleted.

The address information may be stored in the first control pack of the data stream in the first format, and the pack generating section may extract the address information stored in the first control pack.

The pack generating section may extract the address information stored in an attribute information field, on which an arbitrary type of information is describable, within the first control pack.

The pack generating section may extract the address information stored in a data file separately from the data stream.

The address information may show a storage location of a data pack in which a picture representing the video is stored and a storage location of another data pack in which audio to be reproduced synchronously with the picture is stored.

The first data pack may be the first one of video packs including video data or that of audio packs including audio data.

A data stream conversion program according to the present Invention, which is executable by a computer, is used to convert a data stream in a first format into a data stream in a second format. Each data stream includes data packs in which video data and audio data are stored and a control pack for use in a playback control of the data stream. In the data stream in the first format, address information, which represents the addresses of the data packs and which is not required while the data stream is played back, is present and associated with the data stream. In the data stream in the second format, address information, which represents the addresses of the data packs and which is required while the data stream is played back, is stored in the control pack. Conversion processing to be carried out by the computer following the program includes the steps of: acquiring the data stream in the first format and the associated address information thereof; generating a second control pack in the second format from a first control pack in the first format, the second control pack storing the address information acquired; and replacing the first control pack with the second control pack, thereby generating the data stream in the second format from the data stream in the first format.

A recording method according to the present invention is used to record a data stream in a first format. The recording method includes the steps of: receiving data of a content representing video and audio; generating a data pack, in which data of the video is stored, and a data pack, in which data of the audio is stored, based on the data received; acquiring address information that represents the addresses of the data packs arranged; generating a control pack in accordance with control information, which is required for controlling playback of the data packs; arranging the data packs and the control pack in the first format, thereby generating the data stream; acquiring address information that shows a storage locations of the data packs in the data stream; and recording the address information and the data stream on a storage medium in association with each other.

The recording method may further include the step of storing the address information in the control pack.

The recording method may further include the step of storing the address information in a data file separately from the data stream.

The address information may show a storage location of a data pack in which a picture representing the video is stored and a storage location of another data pack in which audio to be reproduced synchronously with the picture is stored.

On a storage medium processed by the recording method, the address information is stored in an attribute information field, on which an arbitrary type of information is describable, within the control pack in the data stream. Alternatively, the storage medium may store the address information in a data file separately from the data stream.

A recorder according to the present invention can record a data stream in a first format on a storage medium. The recorder includes: an encoder, which receives data of a content representing video and audio, generates a data pack, in which data of the video is stored, and a data pack, in which data of the audio is stored, based on the data received and outputs address information that represents the addresses of the data packs arranged; a generating section for generating a control pack in accordance with control information, which is required for controlling playback of the data packs; a system encoder for arranging the data packs and the control pack in the first format, thereby generating the data stream; and a writing section for writing at least the data stream on a storage medium.

The generating section may acquire and describe the address information in the control pack. Alternatively, the writing section may also store the address information in a data file separately from the data stream.

A recording program according to the present invention, which is executable by a computer, is used to generate and record a data stream in a first format. Recording processing to be carried out by the computer following the program includes the steps of: receiving data of a content representing video and audio; generating a data pack, in which data of the video is stored, and a data pack, in which data of the audio is stored, based on the data received; acquiring address information that represents the addresses of the data packs arranged; generating a control pack in accordance with control information, which is required for controlling playback of the data packs; arranging the data packs and the control pack in the first format, thereby generating the data stream; acquiring address information that shows a storage locations of the data packs in the data stream; and recording the address information and the data stream on a storage medium in association with each other.

A data stream conversion method according to the present invention can be used to convert a data stream in a first format into a data stream in a second format. Each data stream includes data packs in which video data and audio data are stored and a control pack for use in a playback control of the data stream. In the data stream in the first format, address information, which represents the addresses of the data packs and which is not required while the data stream is played back, is present and associated with the data stream. In the data stream in the second format, address information, which represents the addresses of the data packs and which is required while the data stream is played back, is stored in the control pack. The conversion method includes the steps of: analyzing the data stream in the first format; finding the arrangement of a first control pack and the data packs in the data stream, thereby acquiring the address information of a predetermined data pack; generating a second control pack in the second format from the first control pack in the first format, the second control pack storing the address information acquired; and replacing the first control pack with the second control pack, thereby generating the data stream in the second format from the data stream in the first format.

BRIEF DESCRIPTION OF DRAWINGS

FIG. 2 shows the data structure of an RDI pack 11a.

FIG. 9(a) shows how to perform a conversion process into stuffing bytes.

FIG. 9(b) shows how to perform a conversion process into a padding packet.

FIG. 9(c) shows how to perform an integration process into a padding packet.

BEST MODE FOR CARRYING OUT THE INVENTION

Hereinafter, content format conversion processing and its related techniques according to the present invention will be described.

As used herein, the "content" refers to a piece of information including video and/or audio. That is to say, the "content" includes video information representing video and/or audio information representing audio. The content may be moving pictures taken with a camcorder or an analog broadcast, for example.

In this description, the format yet to be subjected to the conversion is supposed to be compliant with the DVD Video Recording standard (the VR standard) and the format subjected to the conversion is supposed to be compliant with the DVD Video standard (the Video standard).

Hereinafter, the data structures of two data streams compliant with the VR standard and the Video standard, respectively, will be described first, and then various preferred embodiments of the format conversion processing will be described.

Figure 1:
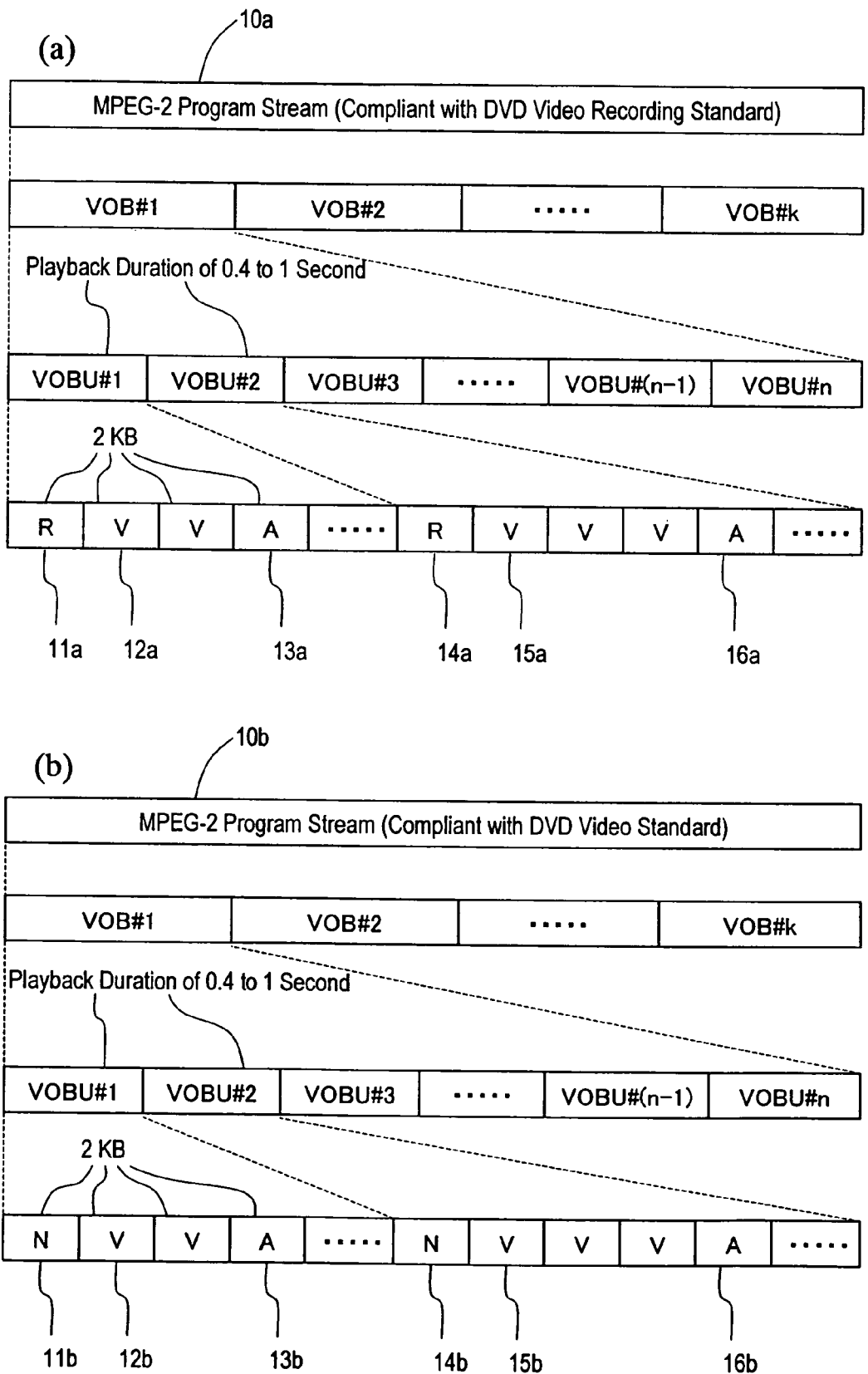
FIG. 1(a) shows a data structure for an MPEG2 program stream 10a compliant with the VR standard.
FIG. 1(b) shows a data structure for an MPEG2 program stream 10b compliant with the Video standard.

FIG. 1(a) shows a data structure for an MPEG2 program stream 10a compliant with the VR standard (which will be referred to herein as a "VR-compliant stream 10a").

The VR-compliant stream 10a includes a plurality of video objects (VOBs) #1, #2, . . . , and #k. Supposing the VR-compliant stream 10a is a content that was taken with a camcorder, for example, each VOB stores moving picture data that was generated during a single video recording session (i.e., since the user started recording the video and until he or she stopped doing it).

Each VOB includes a plurality of VOB units (video object units; VOBUs) #1, #2, . . . , and #n. Each VOBU is a data unit containing data in an amount corresponding to a video playback duration of about 0.4 second to about 1 second. Hereinafter, the data structure of VOBUs will be described with the first and second VOBUs taken as an example.

VOBU #1 is composed of a number of packs. In the VR-compliant stream 10a, each pack has a fixed data length (also called a "pack length") of 2 kilobytes (i.e., 2,048 bytes). At the top of the VOBU, a real time information pack (RDI pack) 11a is positioned as indicated by "R" in FIG. 1(a). The RDI pack 11a is followed by multiple video packs "V" (including a video pack 12a) and multiple audio packs "A" (including an audio pack 13a). It should be noted that if the video data has a variable bit rate, the data size of each VOBU is changeable within a range defined by a maximum read/write rate. However, if the video data has a fixed bit rate, the data size of each VOBU is substantially constant.

Each pack stores the following information. Specifically, the RDI pack 11a stores various information for controlling the playback of the VR-compliant stream 10a, e.g., information representing the playback timing of the VOBU and information for controlling copying of the VR-compliant stream 10a. The video packs 12a store MPEG2-compressed video data thereon. The audio packs 13a store audio data that was compressed so as to comply with the MPEG2 Audio standard, for example. In adjacent video and audio packs 12a and 13a, video and audio data to be played back synchronously with each other may be stored. However, their arrangement (order) may be arbitrarily determined. The VR-compliant stream 10a is supposed herein to include no extension streams. The detailed data structures of the RDI pack 11a and video packs 12a will be described later with reference to FIGS. 2 and 4.

VOBU #2 is also made up of a plurality of packs. An RDI pack 14a is located at the top of VOBU #2, and then followed by a plurality of video packs 15a and a plurality of audio packs 16a. The contents of the information to be stored in these packs are similar to those of VOBU #1.

FIG. 1(b) shows a data structure for an MPEG2 program stream 10b compliant with the Video standard (which will be referred to herein as a "Video-compliant stream 10b").

The data structure of the Video-compliant stream 10b is similar to that of the VR-compliant stream 10a. Specifically, the Video-compliant stream 10b also includes a plurality of VOBs #1, #2, . . . , and #k, each of which consists of a plurality of VOBUs. And each VOBU includes video packs 12b, 15b, etc. and audio packs 13b, 16b, etc. The video packs store video data thereon and the audio packs store audio data thereon.

The differences in data structure between the Video-compliant stream 10b and the VR-compliant stream 10a are as follows. Specifically, in the Video-compliant stream 10b, not the RDI pack of the VR-compliant stream 10a but a navigation pack 11b, 14b, etc. as identified by "N" is located at the top of each VOBU. The navigation pack stores navigation information (to be described later) for controlling the playback of the video data and audio data.

In addition, in the Video-compliant stream 10b, the video pack 12b and the audio pack 13b, which appear first in VOBU #1 of each VOB, have a unique field (i.e., a PES extension field to be described later), which is not included anywhere else within the same VOBU or in any other video pack or audio pack within the same VOB. More specifically, such a field is present in the video pack 12b but absent from the video pack 15b. And such a field is present in the audio pack 13b but absent from the audio pack 16b.

To convert the format of the VR-compliant stream 10a into that of the Video-compliant stream 10b, those differences in data structure need to be taken into consideration. That is why the data structure of the RDI pack of the VR-compliant stream 10a and that of the navigation pack of the Video-compliant stream 10b will be described with reference to FIG. 2 and FIGS. 3(a) through 3(d). And then the data structure of the video packs will be described with reference to FIG. 4.

Figure 2:
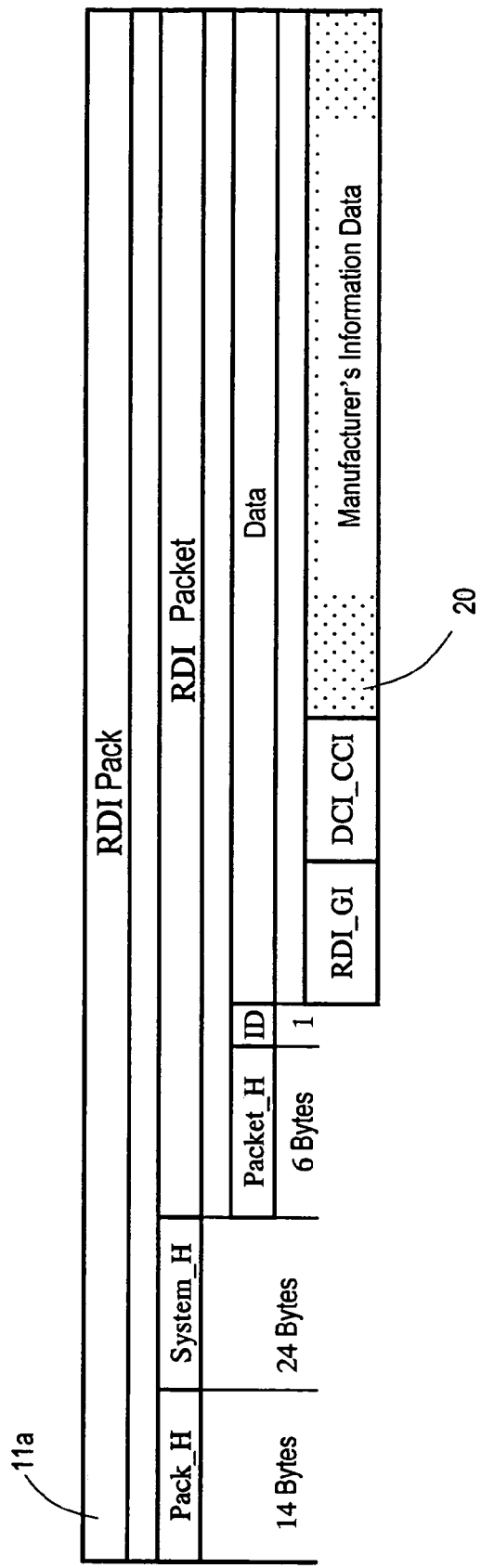

FIG. 2 shows the data structure of the RDI pack 11a. The RDI pack 11a includes a pack header (Pack_H) showing the type of the pack, a system header (system_H) and an RDI packet, which are arranged in this order to make up a pack of 2,048 bytes. The RDI packet includes a packet header (Packet_H) showing the type of the packet, an ID field and a data field. In the data field, a field (RDI_GI) to store RDI information showing the playback timing of the VOBU, a field (DCI_CCI) to store information for controlling copying of the VR-compliant stream 10a, and a manufacturer's information field describing arbitrary attribute information are defined. An apparatus for generating the VR-compliant stream 10a may describe its maker (manufacturer) defined arbitrary information as the attribute information.

Figure 3:
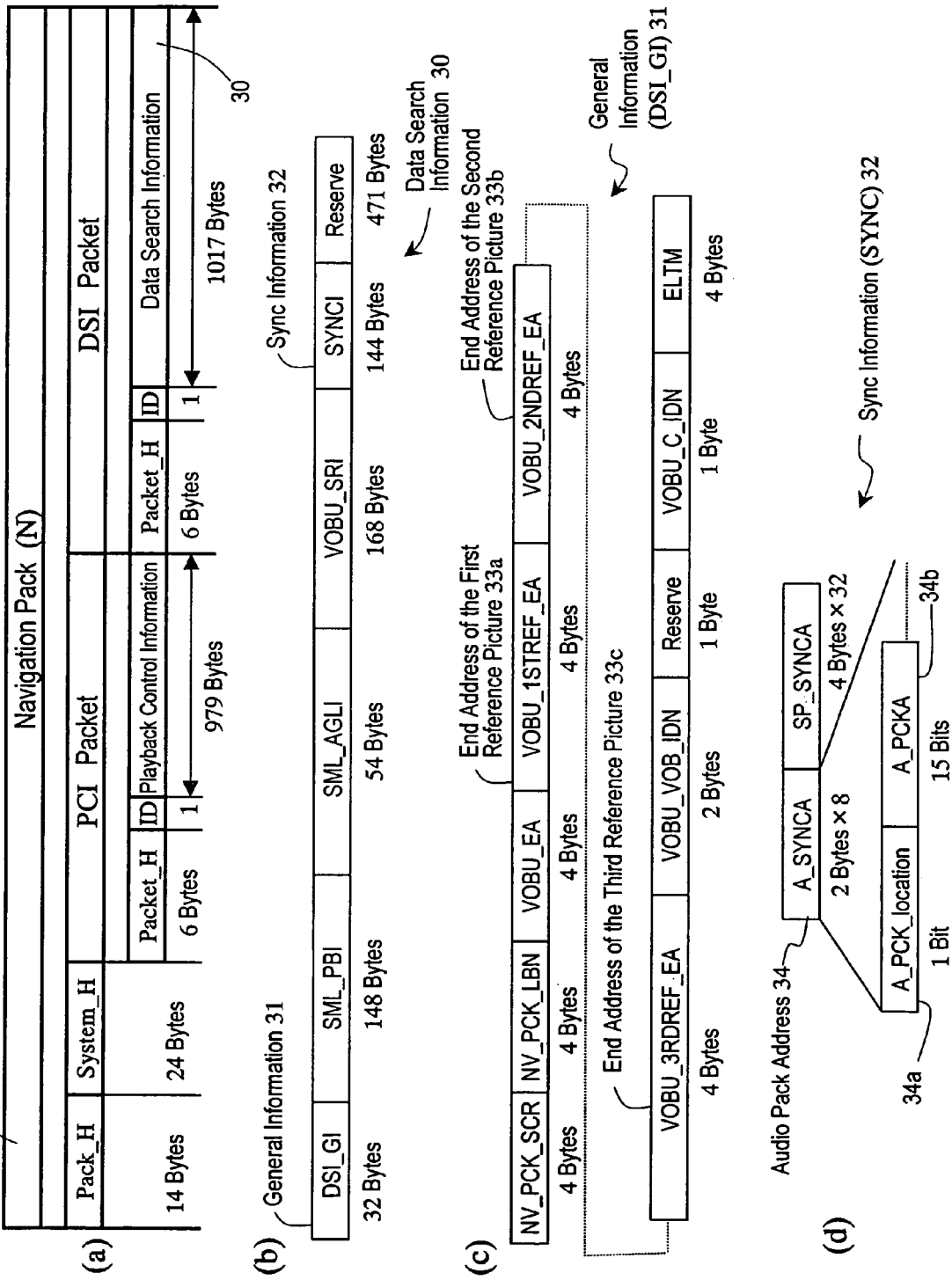
FIG. 3(a) shows the data structure of a navigation pack 11b.
FIG. 3(b) shows the data structure of data search information 30.
FIG. 3(c) shows the data structure of general information 31.
FIG. 3(d) shows the data structure of sync information 32.

FIG. 3(a) shows the data structure of the navigation pack 11b. The navigation pack 11b includes a pack header (Pack_H) showing the type of the pack, a system header (system_H) and a PCI packet and a DSI packet on which playback control information is stored. These headers and packets are also arranged in this order to make up a pack of 2,048 bytes.

Among various data that make up the navigation pack 11b, the data structure of the DSI packet will be described in detail below. The DSI packet forms the second half of the navigation pack 11b, which starts at a location of 1,025 bytes as counted from the top of the navigation pack 11b, and has a data length of 1,024 bytes. In the last field of the DSI packet, which starts at a location of 8 bytes as counted from the top, data search information 30 is stored.

FIG. 3(b) shows the data structure of the data search information 30. The data search information 30 is a collection of various types of information including navigation information for controlling the playback of video data and audio data. Among those types of information, general information (DSI_GI) 31 about the navigation information and sync information (SYNCI) 32 will be described. The general information 31 is arranged at the top of the data search information 30 and has a data length of 32 bytes.

FIG. 3(c) shows the data structure of the general information 31. The general information 31 includes address information VOBU_1STREF_EA 33a, VOBU_2NDREF_EA 33b and VOBU_3RDREF_EA 33c showing the respective addresses of first, second and third video reference pictures. The navigation information described above includes these pieces of address information. The first address information 33a starts at a location of 13 bytes as counted from the top of the general information 31. Each of these pieces of address information 33a, 33b and 33c has a data length of 4 bytes.

The address information is a piece of information indicating the location of a video pack in which the last portion of data, corresponding to its associated reference picture, is stored. More specifically, the "location of a video pack" is represented by a value showing the pack number of that pack as counted from the top of the VOBU. As described above, each pack has a pack length of 2,048 bytes. Thus, the top location of that pack is represented by (value of the address information)×2,048 bytes. Also, the "reference picture" refers to an intra picture encoded with a frame structure, a forward predicted picture encoded with the frame structure, a pair of intra pictures encoded with a field structure, a pair of forward predicted pictures encoded with the field structure, or an intra picture encoded with the field structure and then immediately followed by a forward predicted picture. The reference picture is arbitrarily determined by the playback duration, for example.

FIG. 3(d) shows the data structure of the sync information 32. The sync information 32 includes audio pack address information (A_SYNCA) 34. The navigation information described above includes this address information, too. The address information is a piece of information showing the location of an audio pack in which audio data to be played back synchronously with its associated picture is stored. In this case, the "location of an audio pack" is represented by a value showing the pack number of that pack as counted from the top of the VOBU. The top of the audio pack is located as in the example of the video pack. The sync information 32 has a data size of 144 bytes and is stored up to a location of 403 to 546 bytes as counted from the top of the data search information 30.

The address of a single audio pack is specified by a field (A_PCK_location) 34a and a field (A_PCKA) 34b. The field 34a has a field length of 1 bit, which is used to show whether its associated audio pack is located before or after that bit. If the audio pack is located before that bit, then "1" is set. On the other hand, if the audio pack is located after that bit, then "0" is set. The field 34b has a field length of 15 bits, which is used to describe the location of the audio pack. Eight pairs of fields 34a and 34b, each having a combined length of 2 bytes, may be provided. Thus, a field to describe the address information of the audio pack always has a field length of 16 bytes (=8×2 bytes).

Next, the data structure of a video pack will be described with reference to FIG. 4. As far as the video pack is concerned, the same data structure may be adopted in both of the VR-compliant stream 10a and Video-compliant stream 10b.

Figure 4:
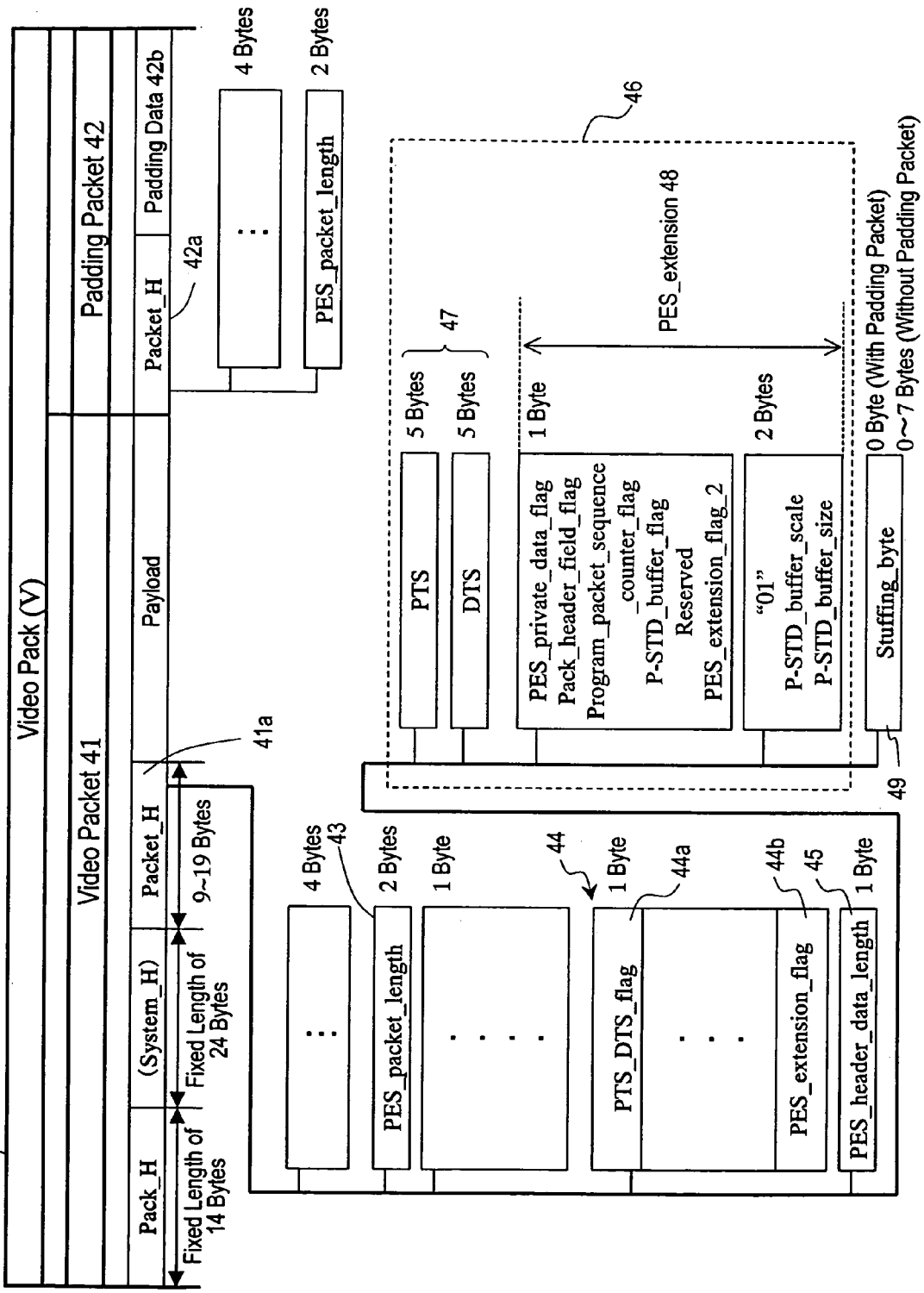
FIG. 4 shows the data structure of the video pack 40.

FIG. 4 shows the data structure of the video pack 40. The video pack 40 includes a video packet 41 and a padding packet 42. The padding packet 42 is provided to adjust the pack length of a data pack. Thus, no padding packets are provided if there is no need to adjust the pack length. In that case, only the video packet 41 will be included in the video packet 40.

The video packet 41 includes a pack header (Pack_H) of 14 bytes, a system header (system_H) of 24 bytes, a packet header (Packet_H) 41a and a payload, which are arranged in this order from the top. In the pack header, information showing the type of the pack (i.e., a video packet in this case) is described. The system header is always added to the first pack of each VOBU. The packet header 41a will be described in detail later. And in the payload, compressed and encoded video data is described.

Meanwhile, the padding packet 42 includes a packet header (Packet_H) 42a and padding data 42b. In the packet header 42a, not only information showing the identity as a padding packet but also the data length (byte length) of the padding packet 42a are described. The data length is described in the field of fifth and sixth bytes (PES_packet_length). A predetermined value is stored as the padding data 42b. This value may be a series of meaningless values "0xFF (hexadecimal number)". The amount of the padding data 42b included is determined so as to adjust the pack length of the video pack 40 to 2,048 bytes as described above.

Next, the data structure of the packet header 41a of the video packet 41 will be described. The packet header 41a includes a packet length field 43, a flag field 44 and a header data length field 45. Depending on the values of a time flag field 44a and a PES extension flag field 44b, the packet header 41a may further include an additional field 46.

In the packet length field 43, a packet length (byte length) as measured from that field through the end of the video packet 41 is described. Accordingly, if there is any padding packet 42, the video packet 41 has a shorter packet length and a smaller packet length value is described in the packet length field 43. The next flag field 44 includes a time flag field (PTS_DTS_flag) 44a and a PES extension flag field (PES_extension_flag) 44b. In the time flag field 44a, a flag showing whether or not there are a presentation time stamp (PTS) and a decoding time stamp (DTS) is described as will be mentioned later. In the PES extension flag field 44b, a flag showing whether or not there is a PES extension field is described as will be mentioned later. And in the header data length field 45, the sum of the field lengths of the additional field 46 and a stuffing byte field 49 is stored.

Next, the additional field 46 will be described. For example, if the time flag field 44a shows that there are both PTS and DTS, one of PTS and DTS fields 47, each having a length of 5 bytes, is provided as the additional field 46. The PTS is information about the presentation time of video data, while the DTS is information about the decoding time. Depending on the value of the time flag field 44a, one of these two fields is provided.

Also, a PES extension field 48 may be provided as the additional field 46. In the PES extension field 48, information required for decoding the program stream 10a or 10b, e.g., the capacity of a decoding data buffer, is described.

In the VR-compliant stream 10a, the PES extension field 48 is provided for the first video pack and the first audio pack in each VOBU. In the Video-compliant stream 10b on the other hand, the PES extension field 48 is provided for the first video pack and the first audio pack in only the first VOBU of each VOB. The PES extension field 48 may be present if the PES extension flag field 44b is one but absent if the PES extension flag field 44b is zero, for example.

The packet header 41a sometimes includes a stuffing byte field 49. In the stuffing byte field 49, stuffing bytes are stored to adjust the pack length. The stuffing bytes are byte data such as meaningless "0xFF" (hexadecimal number). The stuffing byte field 49 and padding packet 42 are provided for the same purpose of adjusting the pack length. Accordingly, conditions that the stuffing bytes are no greater than 7 bytes and that the stuffing bytes 49 and the padding packet 42 cannot be provided in the same pack are defined according to the DVD Video standard. In the example illustrated in FIG. 4, since the padding packet 42 is included in the video pack 40, the length of the stuffing byte field 49 is zero bytes. That is to say, no stuffing byte fields are provided.

The data structure of the video pack is shown in FIG. 4. Although not shown, the audio pack may have a similar data structure. Thus, the same statement applies to the audio pack just by replacing the "video packets" with an "audio packet" and the "video data" stored in the payload with "audio data". For example, in the VR-compliant stream 10a, the PES extension field 48 is provided for the first audio pack in every VOBU. In the Video-compliant stream 10b on the other hand, the PES extension field 48 is provided for the first audio pack in only the first VOBU of each VOB.

EMBODIMENT 1

Hereinafter, the format conversion processing of the present invention will be outlined first, and then a first specific preferred embodiment of the present invention for realizing the format conversion will be described.

Figure 5:
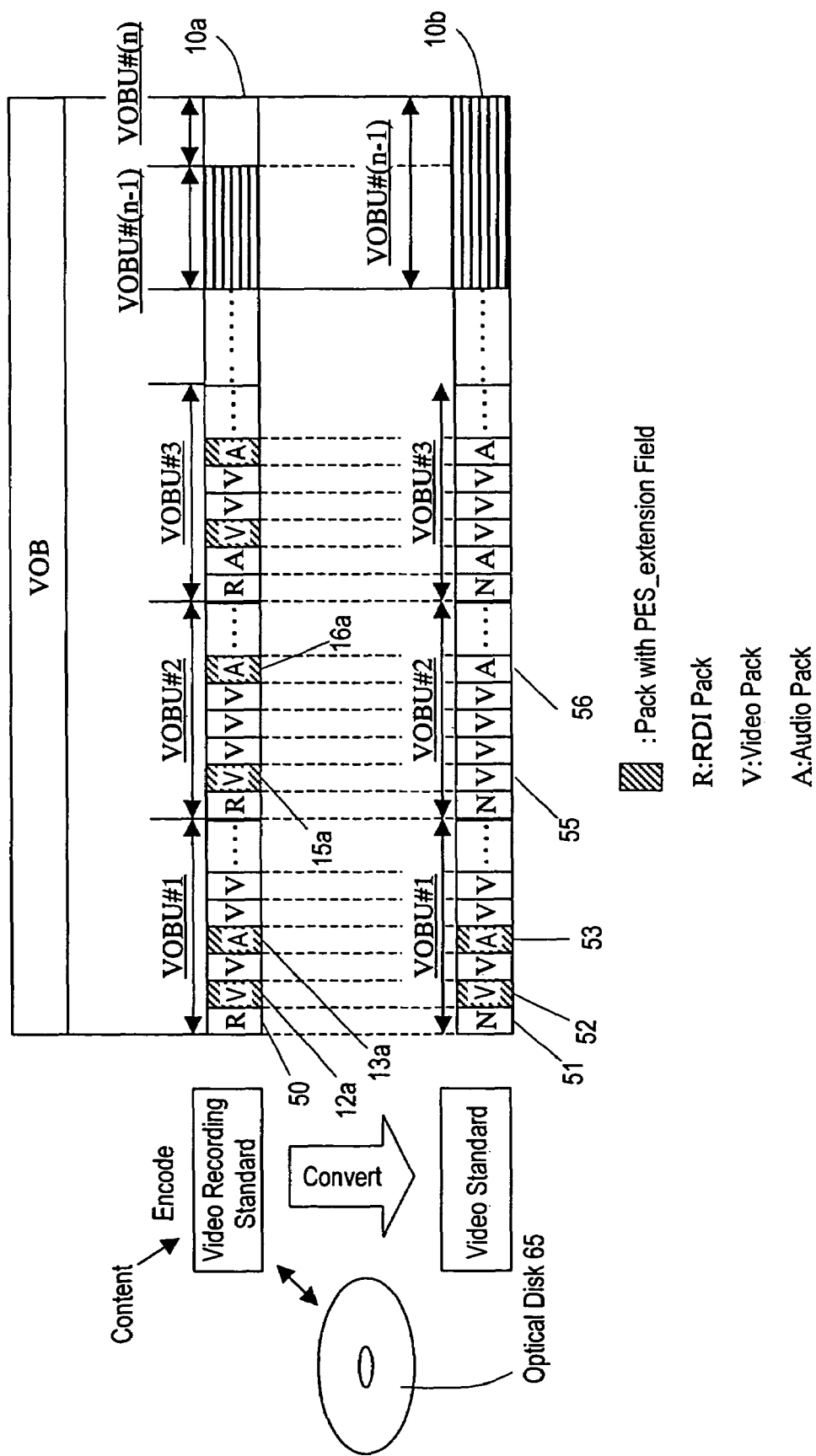
FIG. 5 shows a correlation between the VR-compliant stream 10a and Video-compliant stream 10b in format conversion processing according to the present invention.

FIG. 5 shows a correlation between the VR-compliant stream 10a and Video-compliant stream 10b in format conversion processing according to the present invention. The VR-compliant stream 10a is obtained by encoding a content and is stored in a storage medium such as an optical disk 65 or a hard disk (not shown). For convenience sake, the correlation between the VR-compliant stream 10a and Video-compliant stream 10b is shown in FIG. 5 when one VOB of the VR-compliant stream 10a is converted into a VOB of the Video-compliant stream 10b.

In converting the VR-compliant stream 10a into the Video-compliant stream 10b, it is necessary to perform the process steps of: (1) replacing the RDI packs 50, etc. with the navigation packs 51, etc; (2) nullifying the PES extension fields 48 included in the first video packs 15a, etc. and in the first audio packs 16a, etc. of the second and following VOBUs #2, #3 and so on and performing predetermined processing to adjust the pack length, thereby generating video packs 15b and audio packs 56; and (3) combining a VOBU #n with a video playback duration of 0.4 second or less with the previous VOBU #(n−1) in the VR-compliant stream 10a, thereby generating the VOBU #(n−1) for the Video-compliant stream 10b.

As to the process step (1), in this preferred embodiment, the VR-compliant stream 10a is encoded and the information to be described in the resultant Video-compliant stream 10b is stored in advance in the RDI packs 50 such that the format conversion can be carried out smoothly. More specifically, the address information 33a through 33c of the video pack (see FIG. 3(c)) and the address information 34 of the audio pack (see FIG. 3(d)) are stored in the manufacturer's information field 20 (see FIG. 2) of the RDI pack 50. Thereafter, during the format conversion, those pieces of address information 33a to 33c and 34 are described as they are in the general information 31 and sync information 32 in the navigation pack 51. These pieces of information can be described as they are because the arrangement order of the video and audio packs as defined from the top of each VOBU remains the same in both the VR-compliant stream 10a and the Video-compliant stream 10b before and after the conversion.

Next, in the process step (2), the PES extension fields 48 can be nullified by deleting the PES extension fields 48. More specifically, a flag showing that there are no PES extension fields 48 is described in the PES extension flag field 44b (see FIG. 4). Then, by adding either the padding packet 42 or the stuffing bytes 49, video packs 55 and audio packs 56, each having a pack length of 2,048 bytes, are generated. Depending on whether or not the stuffing bytes are 7 bytes or less and whether or not the stuffing bytes 49 and padding packet 42 are included in the same pack, either the padding packet 42 or the stuffing bytes 49 are added.

In each of the VR-compliant stream and Video-compliant stream, the PES extension fields 48 are included in the first video pack and the first audio pack in the first VOBU. That is why during the format conversion, no special processing such as the process step (2) needs to be carried out on the first video pack 12a and the first audio pack 13a in VOBU #1 of the VR-compliant stream 10a. Thus, the first video pack 52 and the first audio pack 53 in VOBU #1 of the Video-compliant stream 10b may be the same as those packs.

Also, in this preferred embodiment, the process step (3) does not always have to be carried out. This is because the VR-compliant stream is generated in this preferred embodiment such that each VOBU has a fixed data size corresponding to a video playback duration of 0.4 second or more as a matter of principle and there is no need to carry out the process step (3). In other words, the process step (3) needs to be carried out when a VR-compliant stream, in which the data size of VOBUs is not defined at all, should be converted.

Hereinafter, a data processor according to a first preferred embodiment of the present invention, which carries out these processing steps, will be described with respect to its configuration and its more detailed processing.

Figure 6:
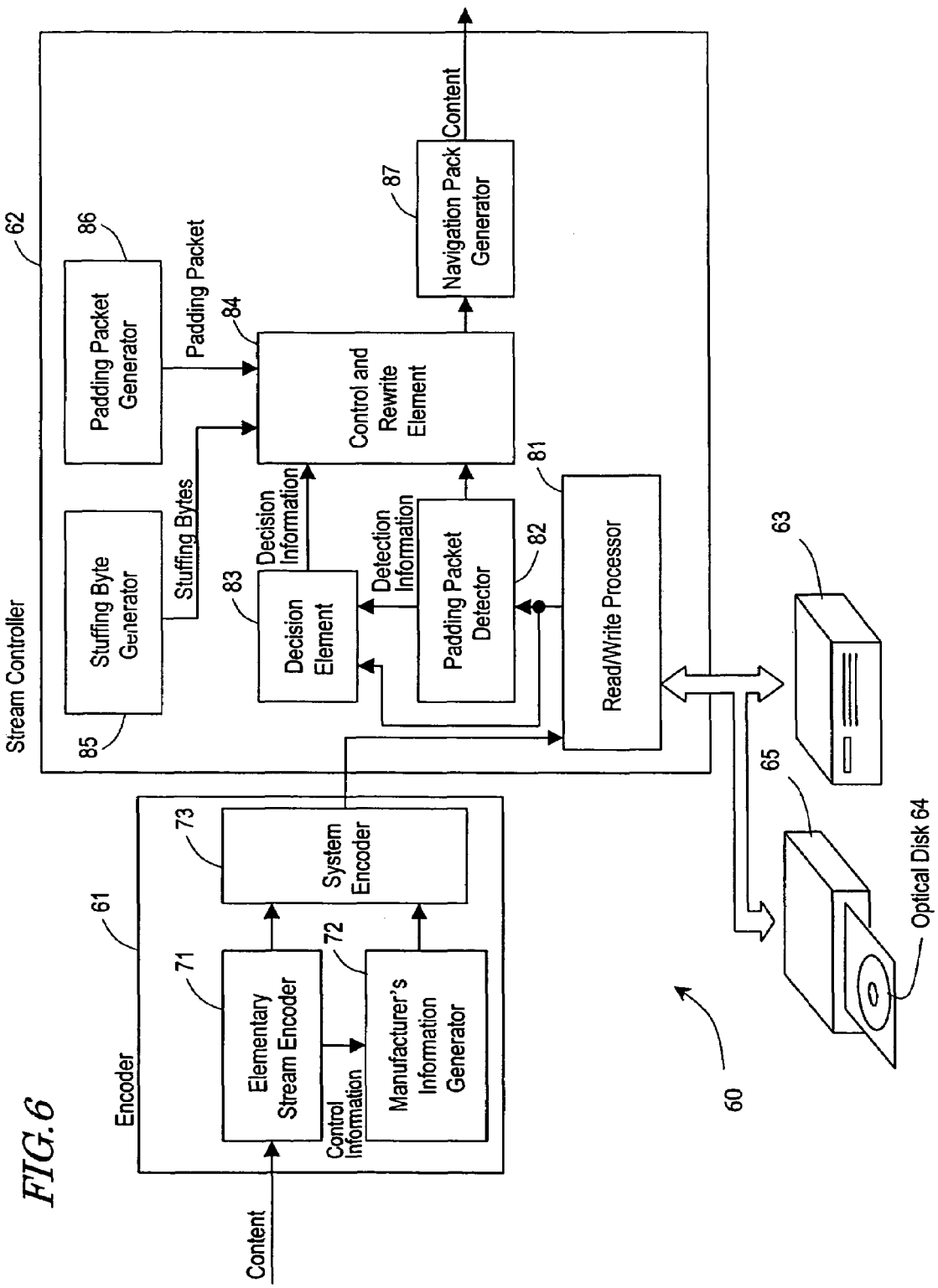
FIG. 6 shows the arrangement of functional blocks in a data processor 60 according to a preferred embodiment of the present invention.

FIG. 6 shows the arrangement of functional blocks in a data processor 60 according to this preferred embodiment. The data processor 60 may receive a content such as an analog broadcast, generate a VR-compliant data stream 10a and then record the stream on a storage medium. Then, the data processor 60 can convert the stored VR-compliant data stream 10a into a Video-compliant data stream 10b and output the Video-compliant stream 10b. That is to say, the data processor 60 has a first function of generating the VR-compliant stream 10a from the content received, a second function of recording the VR-compliant stream 10a generated, and a third function of converting the VR-compliant stream 10a into the Video-compliant stream 10b. The first and third functions may be implemented by some hardware components provided on a dedicated processing chip. Alternatively, those functions may also be realized through a software program to be executed by a normal central processing unit (CPU).

Also, the present invention is described herein as being applied to a storage medium such as an optical disk like a DVD-RAM disk or a hard disk. However, the present invention is in no way limited to those specific preferred embodiments. Also, as long as the medium can store a data stream thereon, the optical disk may have a diameter of 12 cm or 8 cm and may have any storage capacity.

The data processor 60 includes an encoder 61, a stream controller 62, and a hard disk drive (HDD) 63 and/or an optical disk drive 65, which can read and write a data stream from/on a hard disk (not shown) and/or an optical disk 64. The data processor 60 does not always have to include both of the HDD 63 and optical disk drive 65 but may include one of them. Also, the data processor 60 may further include a semiconductor storage medium and its reader/writer, for example, in addition to the optical storage medium such as the optical disk 64 and the magnetic recording medium such as the hard disk. In the following description, however, the data processor 60 is supposed to include the optical disk drive 65.

The encoder 61 receives a content, compresses and encodes the video and audio information included in the content in compliance with the VR standard to generate a VR-compliant stream 10a, and then outputs the stream 10a. Also, the encoder 61 describes address information, representing the addresses of the video and audio packs, as the manufacturer's information 20 in the RDI pack 50 in the VR-compliant stream 10a.

The stream controller 62 receives the VR-compliant stream 10a from the encoder 61 and outputs it to the optical disk drive 65. Also, the stream controller 62 receives the VR-compliant stream 10a from either the encoder 61 or the optical disk drive 65, and extracts the address information of the video and audio packs from the manufacturer's information 20 defined in its RDI pack 50. Then, the stream controller 62 generates a navigation pack 11b compliant with the Video standard by using that address information as it is, and replaces the RDI pack 50 of the VR-compliant stream 10*a* with the navigation pack 11*b*. Furthermore, the stream controller 62 locates the extension fields, which are included only in the first video pack and the first audio pack in the second and following VOBUs of the VR-compliant stream 10*a*, and replaces those fields with stuffing bytes or adds a padding packet 42 to the end of the packs. In this manner, the stream controller 62 obtains and outputs a Video-compliant stream 10*b*.

The optical disk drive 65 receives the VR-compliant stream 10*a* from the stream controller 62 and stores the stream on the optical disk drive 65. Also, the optical disk drive 65 reads the VR-compliant stream 10*a* from the optical disk 64 and outputs it to the stream controller 62. Furthermore, the optical disk drive 65 may also read and write the Video-compliant stream 10*b* obtained by the conversion.

Next, the detailed configurations and operations of the encoder 61 and stream controller 62 will be described.

The encoder 61 includes an elementary stream encoder 71, a manufacturer's information generator 72 and a system encoder 73. In the following description, the elementary stream encoder 71 will be referred to herein as an "ES encoder 71" and the manufacturer's information generator 72 will be referred to herein as an "MI generator 72".

The ES encoder 71 receives a content from an analog broadcasting tuner. In response, the ES encoder 71 compresses and encodes the video and audio information of the input content, generates video and audio packs and then outputs them to the system encoder 73. At the same time, the ES encoder 71 also outputs the address information of the video and audio packs in which the video and audio data to be played back synchronously with each other are stored. The address information is obtained as information showing the pack number of a pack in question as counted from the top of a VOBU. More specifically, the address information (A_SYNCA) of an audio pack associated with certain video and the addresses (VOBU_1STREF_EA, VOBU_2NDREF_EA, and VOBU_3RDREF_EA) of the video packs including the last data of first, second and third video reference pictures are acquired. Then, the ES encoder 71 outputs the address information acquired to the MI generator 72.

Figure 7:
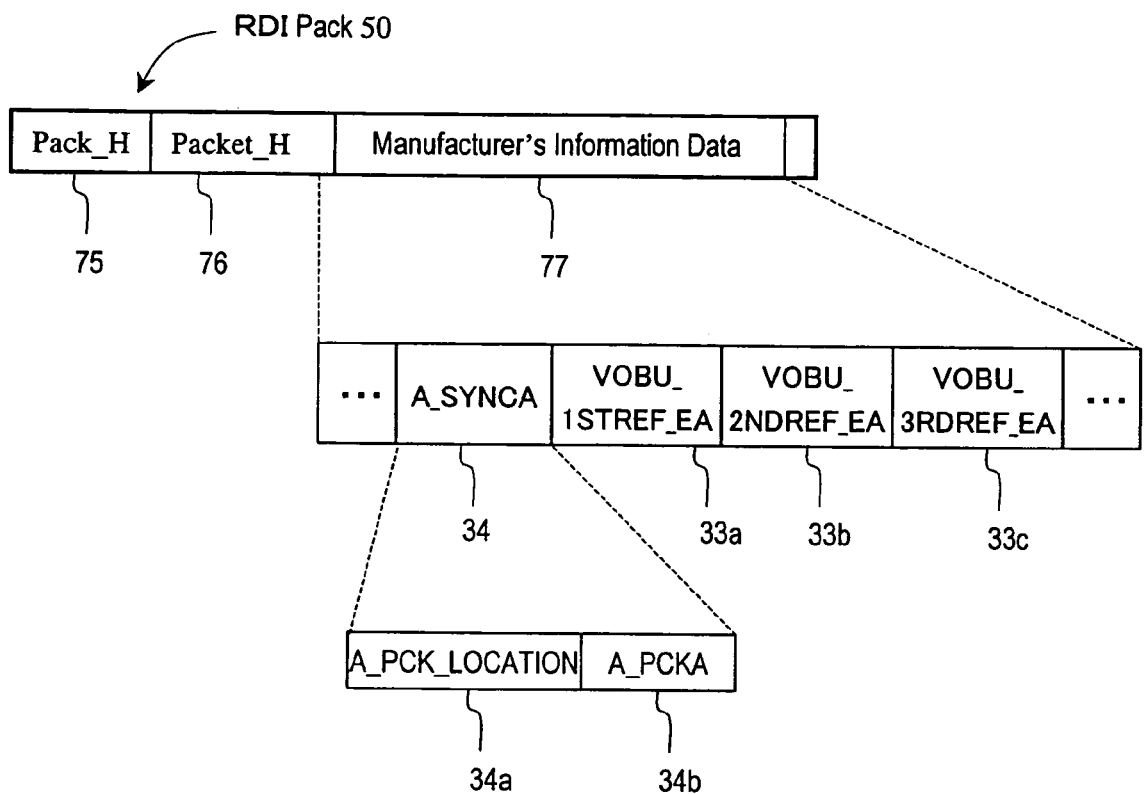
FIG. 7 shows a schematic data structure of an RDI pack 50.

The MI generator 72 generates an RDI pack 50 compliant with the VR standard. FIG. 7 shows a schematic data structure of the RDI pack 50. The MI generator 72 generates a pack header 75, a packet header 76 and so on, thereby making the RDI pack 50 compliant with the VR standard. In this case, the MI generator 72 describes the address information of the received video and audio packs as manufacturer's information data 77. As can be seen from FIG. 7, the data 77 includes the address information 34 of the audio pack and the address information 33*a* to 33*c* of the video pack. FIG. 7 shows the data structure of the RDI pack 50 just schematically. That is why no system headers (see FIG. 2) are shown and the packet header 76 is directly followed by the data 77. Actually, however, a system header may be included and any other data may be inserted between the packet header 76 and the data 77.

Next, the system encoder 73 will be described. The system encoder 73 integrates together the video and audio packs output from the ES encoder 71 and the RDI pack 50 output from the MI generator 72, thereby generating a pack header and a packet header compliant with the VR standard and inserting the RDI pack 50 into a data stream in which the video and audio packs are arranged.

Also, the system encoder 73 adjusts the video playback duration of a VOBU to a predetermined length of 0.4 second or more. Then, the conversion into the Video-compliant stream 10*b* can be done with a reduced processing load and with more ease. Optionally, the video playback duration of a VOBU may be less than 0.4 second. If such a VOBU is present, then that VOBU is combined with its previous VOBU to make sure that every video playback duration is 0.4 second or more before the conversion into the Video-compliant stream 10*b* is done.

Figure 8:
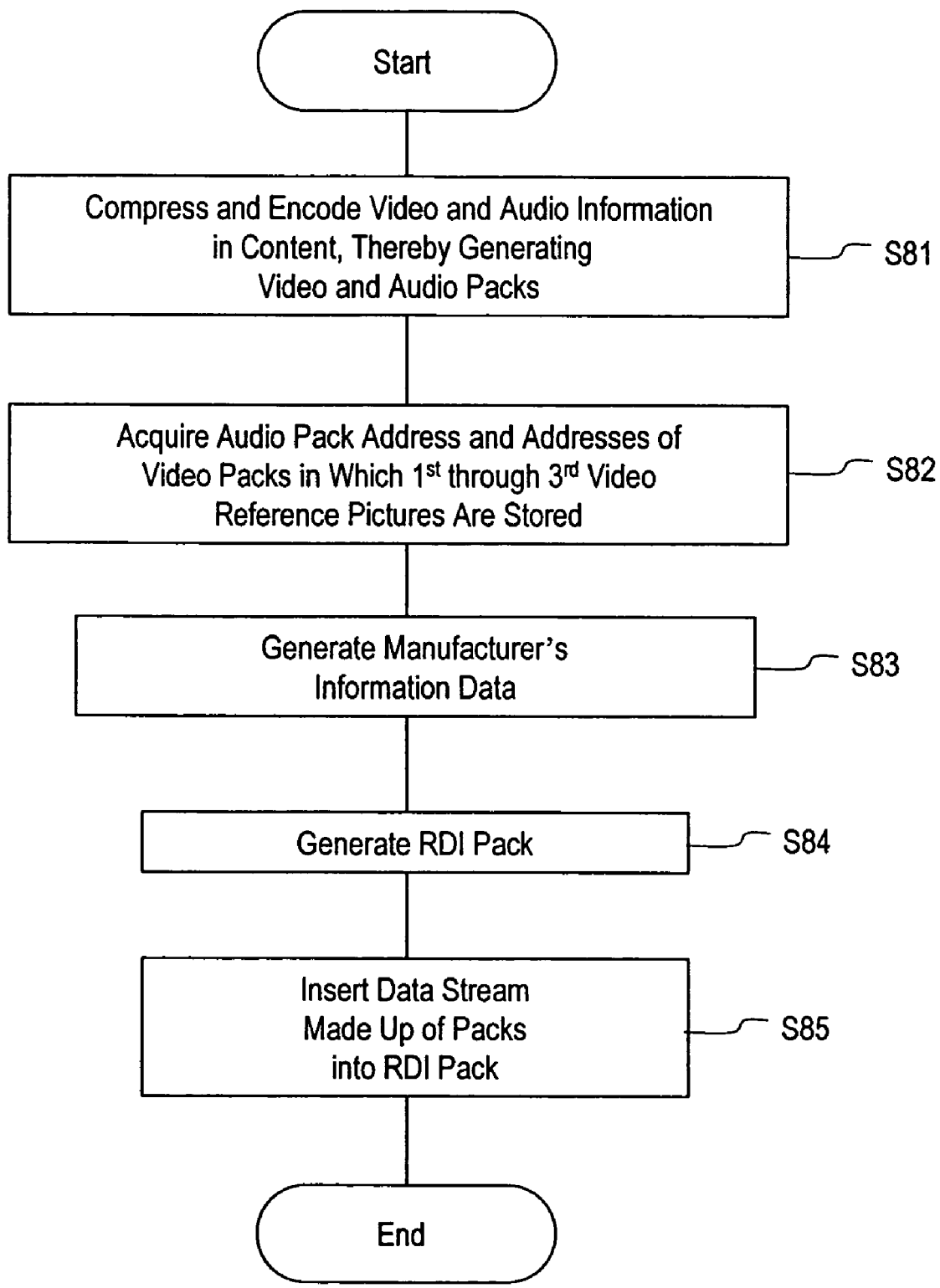
FIG. 8 is a flowchart showing the procedure of processing done by an encoder 61.

FIG. 8 shows the procedure of processing done by the encoder 61. First, in Step S81, the ES encoder 71 compresses and encodes the video and audio information included in the content, thereby generating video and audio packs. Meanwhile, in Step S82, the MI generator 72 acquires the address of the audio pack and the addresses of the video packs in which the first through third video reference pictures are stored from the ES encoder 71. Next, the MI generator 72 generates the manufacturer's information data in Step S83 and the RDI pack 50 in Step S84, respectively. Finally, in Step S85, the system encoder 73 inserts the RDI pack into a data stream made up of a plurality of packs. In this manner, the VR-compliant stream 10*a* can be obtained.

Next, the stream controller 62 will be described with reference to FIG. 6 again. The stream controller 62 includes a read/write processor 81, a padding packet detector 82, a decision element 83, a control and rewrite element 84, a stuffing byte generator 85, a padding packet generator 86 and a navigation pack generator 87.

The read/write processor 81 functions as a transmitter, which receives the VR-compliant stream 10*a* and transmits the VR-compliant stream 10*a* to the optical disk drive 65 in compliance with an interface standard with the optical disk drive 65. In addition, the read/write processor 81 also functions as a receiver for receiving the VR-compliant stream 10*a* that has been read by the optical disk drive 65 from the optical disk 64. Furthermore, the read/write processor 81 outputs the VR-compliant stream 10*a* received to the padding packet detector 82 and the decision element 83.

For example, if the stream controller 62 and the optical disk drive 65 are connected together through an ATA/ATAPI interface, then the read/write processor 81 is an ATA/ATAPI controller and transmits and receives an ATA/ATAPI-compliant data stream to/from the optical disk drive 65. However, this conversion processing does not constitute an important feature of the present invention and the description thereof will be omitted herein.

The padding packet detector 82 determines whether or not each pack of the VR-compliant stream 10*a* has a padding packet, thereby outputting detection information, showing the presence or absence of the padding packet, to the decision element 83. This decision is made on each and every pack. Thereafter, the padding packet detector 82 outputs the VR-compliant stream 10*a* to the control and rewrite element 84.

Now it will be described how the padding packet detector 82 detects the padding packet.

Specifically, the padding packet detector 82 detects the packet header 41*a* of each pack and acquires the packet length information that is stored in the packet length field 43 of the packet header 41*a*. If the padding packet detector 82 finds the packet length 2,028 bytes, then the detector 82 judges that there are no padding packets. On the other hand, if the padding packet detector 82 finds the packet length less than 2,028 bytes, then the detector 82 judges that there are padding packets. The reasons are that each pack has a fixed pack length of 2,048 bytes, that the pack header has a fixed length of 14 bytes, and the data length from the top of the packet header 41*a* through the end of the packet length field 43 is also fixed at 6 bytes. Also, since the padding packet should be detected from the first video pack and the first audio pack in the second and following VOBUs, there are no system headers. As a result, the data length from the top of the pack through the end of the packet length field 43 is 20 bytes. Accordingly, if the packet length is described as 2,028 bytes, then it can be judged that only video and audio packs are included in the pack and there are no padding packets. On the other hand, if the packet length is not equal to (i.e., less than) 2,028 bytes, then it can be judged that other data (i.e., a padding packet) should be included because that packet alone cannot meet the prescribed pack length.

Next, in accordance with the detection information showing either the presence or absence of the padding packet, the decision element 83 determines what processing should be done to nullify the PES fields 48 in the pack and outputs decision information. More particularly, in accordance with the detection information, the decision element 83 makes the following judgments (a) through (d) and outputs the decision information, instructing what processing should be done, to the control and rewrite element 8.

(a) If there are no padding packets and if the stuffing byte length is 4 bytes or less, then the PES extension fields 48 are replaced with stuffing bytes;

(b) If there are no padding packets and if the stuffing byte length is greater than 4 bytes (i.e., 5 bytes or more), then the PES extension fields 48 and the stuffing bytes are replaced with a padding packet;

(c) If there is a padding packet, then the PES extension fields 48 are integrated into the padding packet; and (d) If the pack currently processed is a pack of the first VOBU or a pack including no PES extension fields 48, then the pack is used as it is.

In the processing steps (a), (b) and (c), it is determined which is more appropriate to use either the stuffing bytes or the padding packet in order to adjust the pack length by deleting the PES extension fields 48. In each of these situations, adjustments are made such that the stuffing bytes have a length of 7 bytes or less and that the stuffing bytes 49 and the padding packet 42 are not included in the same pack.

In the processing step (d) on the other hand, there is no need to nullify the PES extension fields 48 and it is determined that the pack is not processed. Optionally, on being notified by a host microcomputer (not shown), for example, that the pack currently processed is a one of the packs of the first VOBU, the control and rewrite element 84 may make the decision (d) directly.

The contents of the processing steps (a) through (c) will be described in further detail with reference to FIGS. 9(*a*) through 9(*c*).

The processing step (a) corresponds to the conversion shown in FIG. 9(*a*). FIG. 9(*a*) shows how to perform a conversion process into stuffing bytes. The PES extension field 90 of 3 bytes is deleted and replaced with a stuffing byte field 91 of 3 bytes.

In FIG. 9(*a*), there are no stuffing bytes in the pack yet to be converted. However, stuffing bytes may also be included in advance as long as their length is equal to or smaller than a reference length of 4 bytes. The reason is that the PES extension field 48 has a field length of 3 bytes and the overall length will be 7 bytes or less if the stuffing bytes have a length of 4 bytes or less.

The decision element 83 calculates the data length of the existent stuffing bytes in the following manner. Specifically, the decision element 83 subtracts the field length of the PTS/DTS field 47 and that of the PES extension field 48 from the data length described in the header data length field 45 of the packet header 41*a*.

In this case, each of the PTS and DTS fields 47 has a length of 5 bytes and its presence or absence is shown in the time flag field 44*a*. Accordingly, the field length of the PTS/DTS field 47 is 0 bytes if neither the PTS field 47 nor the DTS field 47 is present, 5 bytes if either the PTS field 47 or the DTS field 47 is present, and 10 bytes if both the PTS field 47 and the DTS field 47 are present. Also, the PES extension field 48 has a length of 3 bytes and its presence or absence is shown in the PES extension flag field 44*b*. Accordingly, the field length of the PES extension field 48 is 3 bytes if there is a PES extension field 48 and 0 bytes if there is no PES extension field 48.

The decision element 83 can obtain the data length of the stuffing bytes 49 by these calculations.

The processing step (b) corresponds to the conversion shown in FIG. 9(*b*). FIG. 9(*b*) shows how to perform a conversion process into a padding packet. This processing step is adopted when the stuffing byte length would exceed 7 bytes if the processing step (a) were performed. Thus, a padding packet, which makes a data length exceeding 7 bytes adjustable, is used. The PES extension field 92*a* and stuffing byte field 92*b* are deleted from the packet header 94 and instead a padding packet 93 is added. The packet length of the padding packet is equal to the sum of the field length of the PES extension field 48 and the data length of the stuffing bytes.

The processing step (c) corresponds to the conversion shown in FIG. 9(*c*). FIG. 9(*c*) shows how to perform an integration process into a padding packet. This processing step is adopted when there is already a padding packet and no stuffing bytes can be added. The PES extension field 96 is deleted from the packet header 99 and padding bytes, having a data length corresponding to the field length of the PES extension field 96, are integrated into the existent padding packet 98.

Referring back to FIG. 6, the control and rewrite element 84 receives the VR-compliant stream 10*a* from the padding packet detector 82, the decision information from the decision element 83, and the stuffing bytes from the stuffing byte generator 11 or the padding packet from the padding packet generator 86, respectively. Also, the control and rewrite element 84 performs the process of nullifying the PES extension fields 48 in accordance with the decision information.

In this nullifying process, the control and rewrite element 84 changes the flag in the PES extension flag field 44*b* into a value showing that there are no PES extension fields 48 (e.g., "0") and adds either stuffing bytes or padding packet.

If the decision information instructs to substitute stuffing bytes, then the control and rewrite element 84 replaces the data located in the PES extension fields 48 with the stuffing bytes supplied from the stuffing byte generator 11.

On the other hand, if the decision information instructs that a padding packet should be substituted, then the control and rewrite element 84 deletes the area for the PES extension field 48, shifts the following payload data thereto with no space left, and then adds a padding packet to the end of that packet. The packet length (PES_packet_length) of the padding packet to be inserted is (3 bytes+stuffing byte length—packet header length of 6 bytes of padding packet), i.e., (stuffing byte length—3) bytes. During this processing step, the control and rewrite element 84 rewrites not only the packet length field 43 and header data length 45 in the pack but also the PES extension flag field 44*b* as well. The rewritten value of the PES extension flag field 44*b* and rewritten header data length are obtained by subtracting 3 bytes, corresponding to the field length of the PES extension field 48, and the stuffing byte length from the original packet length and header data length before the conversion.

It should be noted that if the decision information instructs that the pack be used as it is, then the control and rewrite element 84 does not have to perform the process of nullifying the PES extension fields 48. The control and rewrite element 84 sequentially sends the processed or non-processed packs to the navigation pack generator 87. Stated otherwise, the replacing and nullifying processing performed by the control and rewrite element 84 is a pack conversion process. Also, supposing the converted pack remains the same as the pack yet to be converted, the term "conversion" could apply even if no nullifying process were carried out.

The stuffing byte generator 85 generates and outputs byte data having a predetermined value "0xFF" to be used as the stuffing bytes. Meanwhile, the padding packet generator 86 generates and outputs a padding packet 42 having a predetermined packet header 42a and padding data 42b. Optionally, the packet length field and padding data 42b may not be fixed but may be described by the control and rewrite element 84 that has fixed its packet length.

The navigation pack generator 87 extracts the address information described as the navigation information (i.e., A_SYNCA, VOBU_1STREF_EA, VOBU_2NDREF_EA, and VOBU_3RDREF_EA) from the manufacturer's information 20 in the RDI pack 50 in the stream, thereby generating a navigation pack 51 compliant with the Video standard. Its detailed data structure is just as described with reference to FIGS. 3(a) through 3(d). Thereafter, the navigation pack generator 87 arranges other rewritten or original packs (such as video and audio packs) and replaces the RDI pack 50 with a navigation pack 51.

Next, if there is a VOBU having a video playback duration of 0.4 second or less in the VR-compliant stream 10a, then the navigation pack generator 87 combines that VOBU with its previous VOBU into a single VOBU. For example, if the VOBU #n shown in FIG. 5 is a VOBU having a video playback duration of 0.4 second or less, then the navigation pack generator 87 combines that VOBU #n with the previous VOBU #(n−1). Alternatively, the navigation pack generator 87 may extend the playback duration of VOBU #n to more than 0.4 second by shifting the end time thereof.

The navigation pack generator 87 obtains the Video-compliant stream 10b by performing this processing. Then, the navigation pack generator 87 outputs the resultant Video-compliant stream 10b.

Figure 10:
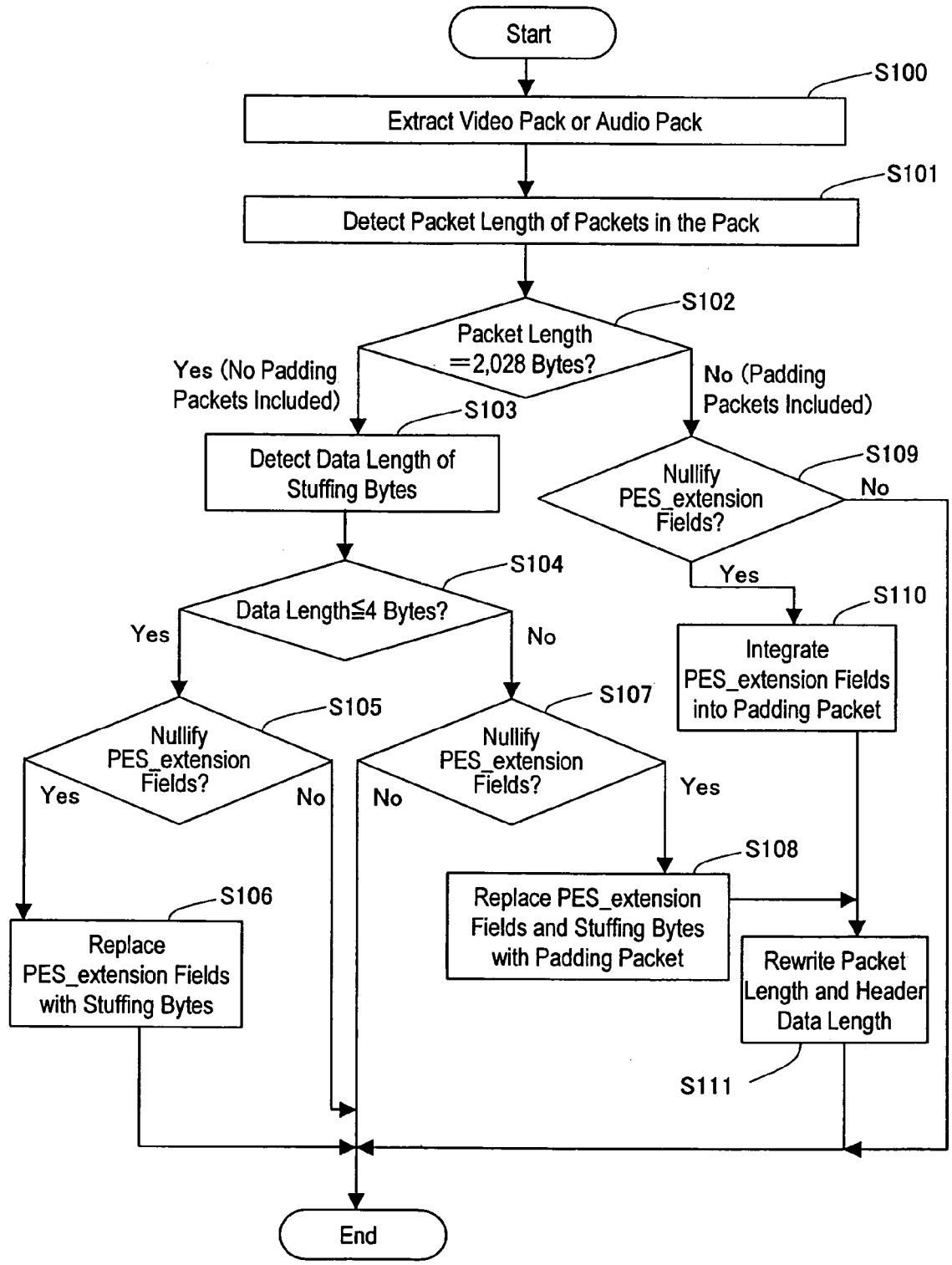
FIG. 10 is a flowchart showing a procedure of the format conversion.

Hereinafter, it will be described with reference to FIG. 10 how the stream controller 62 performs the format conversion processing. FIG. 10 is a flowchart showing a procedure of the format conversion. First, in Step S100, the read/write processor 81 receives a VR-compliant stream 10a that has been read by the optical disk drive 65, replaces the RDI pack 50 with a navigation pack 51, and extracts a video pack or an audio pack from the VR-compliant stream 10a. The padding packet detector 82 detects the packet length of the packets included in the pack in Step S101 and then determines in Step S102 whether or not the packet length is 2,028 bytes. If the answer is YES, then there are no padding packets in the pack and the process advances to the next processing step S103. Otherwise, there is a padding packet and the process advances to the processing step S109.

The decision element 83 detects the data length of the stuffing bytes in Step S103 and then determines in Step S104 whether or not the data length is 4 bytes or less. If the answer is YES, then the process advances to the next processing step S105. Otherwise, the process advances to the step S107. In Step S105, the decision element 83 determines whether or not to nullify the PES extension fields 48. If the answer is YES, the process advances to the next processing step S106. Otherwise, the process ends. The PES extension fields 48 should not be nullified when the pack is included in the first VOBU of a VOB, for example. In Step S106, the control and rewrite element 84 replaces the PES extension fields 48 with stuffing bytes. This processing step corresponds to the conversion shown in FIG. 9(a). That is to say, the control and rewrite element 84 functions as a converting section for performing conversion processing.

In Step S107, the decision element 83 also determines whether or not to nullify the PES extension fields 48. If the answer is YES, the process advances to the next processing step S108. Otherwise, the process ends. In Step S108, the control and rewrite element 84 deletes the PES extension field 48 and the stuffing byte field and adds a padding packet. This processing step corresponds to the conversion shown in FIG. 9(b). Next, the process advances to the processing step S111, in which the control and rewrite element 84 rewrites the packet length 43 and the header data length 45.

On the other hand, in Step S109, the decision element 83 also determines whether or not to nullify the PES extension fields 48. If the answer is YES, the process advances to the next processing step S110. Otherwise, the process ends. In Step S110, the control and rewrite element 84 deletes the PES extension field 48 and adds a padding packet. This processing step corresponds to the conversion shown in FIG. 9(c). Next, in Step S111, the control and rewrite element 84 rewrites the packet length 43 and the header data length 45.

By performing these processing steps on each and every pack, the data stream format can be converted from a VR-compliant one into a Video-compliant one.

Figure 11:
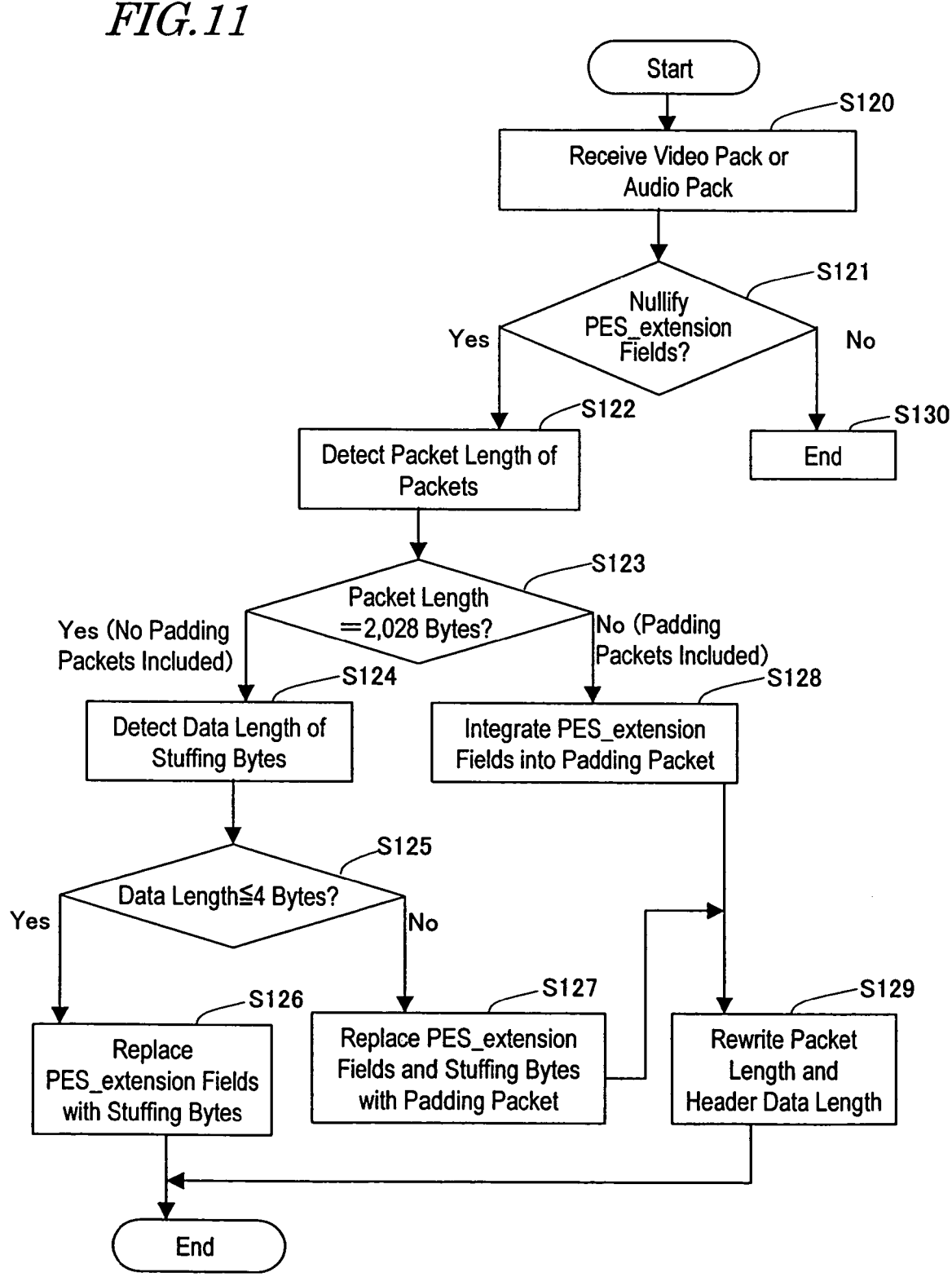
FIG. 11 is a flowchart showing another procedure of the format conversion.

Next, another exemplary conversion processing will be described with reference to FIG. 11. FIG. 11 is a flowchart showing another procedure of the format conversion. First, in Step S120, either a video pack or an audio pack is received as in Step S100 shown in FIG. 10. Next, in Step S121, the decision element 83 determines whether or not to nullify the PES extension fields 48. If the answer is YES, the process advances to the next processing step S122. Otherwise, the process advances to the processing step S130. The padding packet detector 82 detects the packet length of the packets in Step S122 and then determines in Step S123 whether or not the packet length is 2,028 bytes. If the answer is YES, then there are no padding packets in the pack and the process advances to the next processing step S124. Otherwise, there is a padding packet and the process advances to the processing step S128.

The decision element 83 detects the data length of the stuffing bytes in Step S124 and then determines in Step S125 whether or not the data length is 4 bytes or less. If the answer is YES, then the process advances to the next processing step S126. Otherwise, the process advances to the step S127. In Step S126, the control and rewrite element 84 replaces the PES extension field 48 with the stuffing bytes and finishes processing that pack. In Step S127, the control and rewrite element 84 deletes the PES extension field 48 and the stuffing byte field and adds a padding packet. Thereafter, the process advances to the processing step S129.

In Step S128 on the other hand, the control and rewrite element 84 deletes the PES extension field 48 and adds a padding packet. Next, in Step S129, the control and rewrite unit 84 rewrites the packet length 43 and the header data length 45, thus finishing processing that pack.

According to the processing described above, a data stream compliant with the DVD Video standard can be generated without decoding and re-encoding a data stream that was recorded so as to comply with the DVD Video Recording standard. As a result, format conversion is realized quickly without deteriorating the image quality. In addition, since the processing load is light, this method can also be implemented by even a system with low processing performance.

On top of that, according to the processing described above, the playback duration of a VOBU can also be adjusted during the format conversion. Consequently, a VOBU compliant with the DVD Video Recording standard can have a more arbitrarily defined data size.

EMBODIMENT 2

In the first preferred embodiment of the present invention described above, the navigation information (i.e., the address information of predetermined video and audio packs) to be stored in a navigation pack of a Video-compliant stream is supposed to be stored in advance in the RDI pack of a VR-compliant stream yet to be converted.

Meanwhile, in this second preferred embodiment, that navigation information is retained as a different file on a storage medium separately from the VR-compliant stream.

Figure 12:
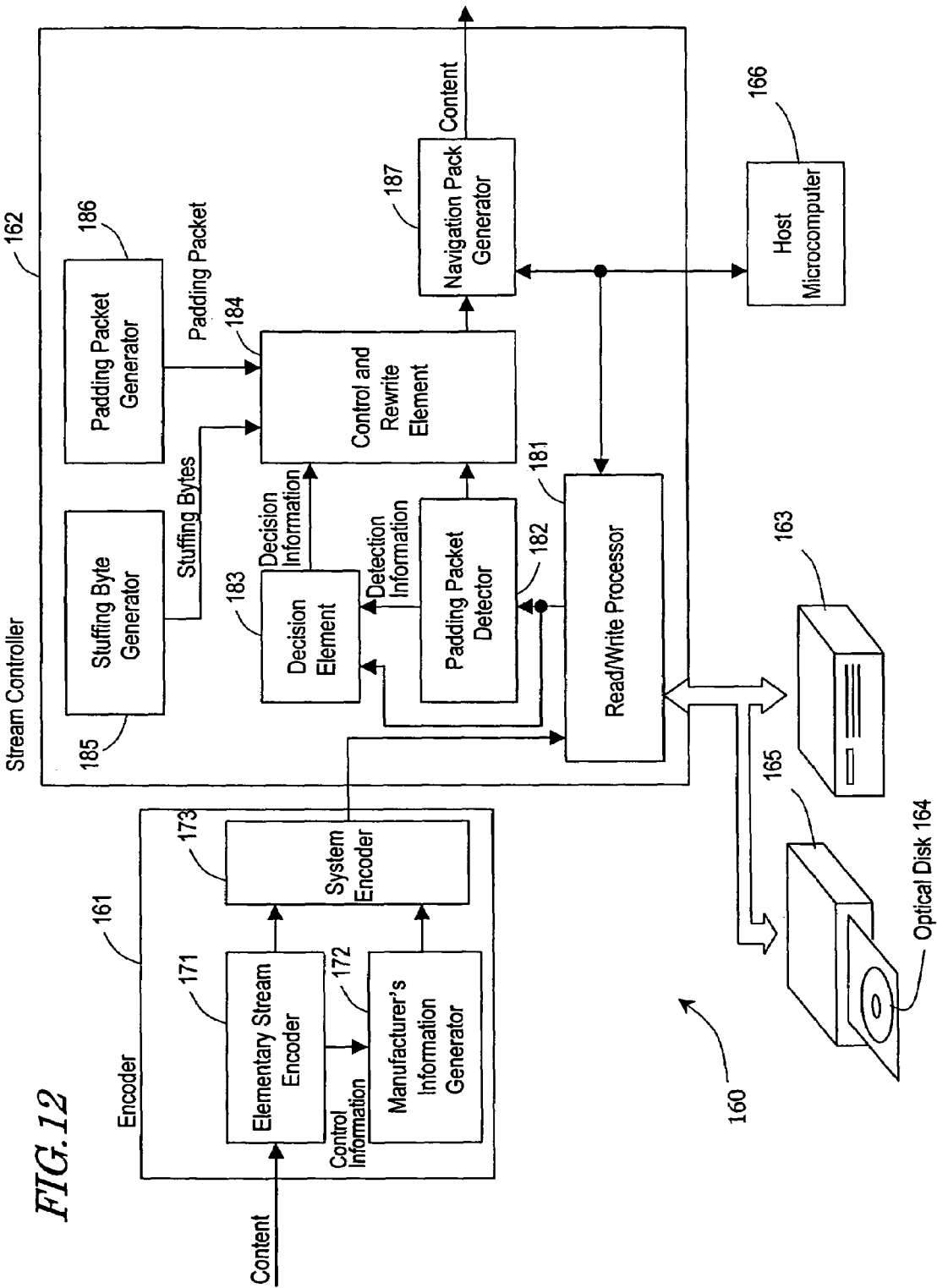
FIG. 12 shows the arrangement of functional blocks in a data processor 160 according to another preferred embodiment of the present invention.

FIG. 12 shows the arrangement of functional blocks in a data processor 160 according to this second preferred embodiment of the present invention. The data processor 160 includes an encoder 161, a stream controller 162, an HDD 163, an optical disk drive 165, and a host microcomputer 166.

The data processor 160 is different from the data processor 60 of the first preferred embodiment in the respective operations of the manufacturer's information generator 172 in the encoder 161, the host microcomputer 166, and the navigation pack generator 187 in the stream controller 162. Each of the other components shown in FIG. 12 performs the same processing as its counterpart of the data processor 60 identified by the same name in FIG. 6. Thus, the following description will be focused on operations involving those components that are different from the counterparts of the data processor 60.

First, the MI generator 172 generates an RDI pack 11a compliant with the VR standard. In this preferred embodiment, however, the MI generator 172 does not store navigation information in the manufacturer's information field 20 of the RDI pack.

On the other hand, the host microcomputer 166 receives the address information 33a through 33c and 34 of predetermined video and audio packs shown in FIG. 7 (i.e., A SYNCA, VOBU_1STREF_EA, VOBU_2NDREF_EA, and VOBU_3RDREF_EA) as navigation information from the ES encoder 171. Then, the host microcomputer 166 instructs the read/write processor 181 and optical disk drive 165 to store the navigation information in a different data file separately from that of the VR-compliant stream.

It should be noted that to find what VR-compliant stream the navigation information stored in a navigation information file is associated with, a VR-compliant stream file and its associated navigation information file are preferably correlated with each other in one way or the other. For example, the VR-compliant stream file and navigation information file may be correlated with each other by giving them the same file name and only different extensions. In that case, in converting the format of a VR-compliant stream into that of a Video-compliant stream-after that, a navigation file associated with the given VR-compliant stream can be located easily.

Furthermore, the host microcomputer 166 can get the stored VR-compliant stream file and navigation information file read by the read/write processor 181. During the format conversion processing, the host microcomputer 166 reads the navigation information file and outputs it to the navigation pack generator 187. Alternatively, the host microcomputer 166 may generate the navigation pack 11b by itself. As to the format conversion processing, the pack may be converted in the same procedure as that described for the first preferred embodiment. Thus, the description thereof will be omitted herein for this preferred embodiment.

The navigation pack generator 187 stores the navigation information that has been received from the host microcomputer 166, thereby generating the navigation pack 11b. Then, the navigation pack generator 187 detects the RDI pack 11a from the VR-compliant stream and replaces the RDI pack 11a with the navigation pack 11b generated. It should be noted that these two replacing and replaced packs need to be packs for controlling the playback of associated video and audio packs such as the RDI pack 50 and navigation pack 51 shown in FIG. 5.

In each of the first and second specific preferred embodiments of the present invention described above, navigation information is supposed to be generated when the VR-compliant stream 10a is generated. However, the navigation information may also be generated while the VR-compliant stream 10a is converted into a Video-compliant stream, not when the VR-compliant stream 10a is generated.

Hereinafter, it will be described how to acquire the navigation information during the format conversion by using the data processor 60 of the first preferred embodiment shown in FIG. 6.

On getting the VR-compliant stream 10a read by the read/write processor 81, the data processor 60 detects the various types of headers of the RDI pack 11a, video pack and audio pack included in the VR-compliant stream 10a and analyzes their contents. The headers to detect include at least the sequence header, GOP header and picture header (none of which is shown) in an elementary stream in the VR-compliant stream 10a. These headers are well known in the art and detailed description thereof will be omitted herein. As a result of the analysis, the data processor 60 determines the arrangement of packs in the VR-compliant stream 10a and acquires the address information of video packs, in which reference pictures required as the navigation information are stored, and the address information of an audio pack. In this manner, the navigation information to be stored in the navigation pack 11b of the Video-compliant stream 10b can be obtained. The other processing steps to be done for the purpose of format conversion are performed just as already described for the first preferred embodiment.

In this manner, a content that was recorded so as to comply with the DVD Video Recording standard can be converted into one compliant with the DVD Video standard quickly and without deteriorating the image quality.

In the foregoing description, format conversion from the VR-compliant stream 10a into the Video-compliant stream 10b has been described. However, the processing described above is also applicable to any data stream, other than the VR-compliant stream 10a, as long as the data structure of the alternative stream is similar to that of the VR-compliant stream 10a. For example, the processing described above is applicable to a movie take file (MTF) that defines a program stream compliant with the MPEG2-Video standard. In an MTF, a P2 stream corresponds to a VOB shown in FIG. 5 and a P2 sample corresponds to a VOBU. The P2 sample includes a control pack, which is used for controlling the playback of a data stream, at the top and a plurality of video packs and audio packs that follow the control pack. Thus, the data structure of the P2 sample is similar to that of the VR-compliant stream 10a described above.

When the present invention is applied to the P2 sample, the addresses of respective video and audio packs may be described in the control pack of the P2 sample.

In the first preferred embodiment described above, the address information of reference picture related video packs and that of an audio pack are described in the manufacturer's information field of the RDI pack. However, that address information may also be stored in any other field. For example, a field for managing the overall data stream with "stream information" may be provided and the address information of the reference pictures and that of an audio pack may be described in that field. In the first preferred embodiment described above, three pieces of address information of the first through third reference pictures are supposed to be described in the RDI pack. Alternatively, the address information of only the first reference picture, for example, may be stored in a different data file (control file) as described for the second preferred embodiment. Furthermore, in that control file, a flag representing whether or not the address information of the second and third reference pictures and the address information of the audio pack are included in the stream information is preferably described. For example, a flag of "1" may be set up when the address information is described and a flag of "0" may be raised otherwise.

In the data processor 60 or 160 of the present invention, each of the functional blocks thereof may function either by itself or in combination with any other block. For example, if the data processor 60 shown in FIG. 6 is a read-only DVD player, then the data processor 60 consists of the optical disk drive 65 and the stream controller 62 only. When the optical disk 64, on which the VR-compliant stream 10a of the present invention is stored, is loaded into the optical disk drive 65, the data processor 60 can perform the format conversion described above.

The data processor 60 or 160 can perform the processing of generating, writing and reading a data stream according to a computer program. For example, the processing of generating an encoded stream of a given content so that the stream can be easily subjected to format conversion may be carried out by executing a computer program that is described based on the flowchart shown in FIG. 8. The format conversion processing itself may be carried out by executing a computer program that is described based on the flowchart shown in FIG. 10 or 11. The computer program may be stored in any of various types of storage media. Examples of preferred storage media include optical storage media such as optical disks, semiconductor storage media such as an SD memory card and an EEPROM, and magnetic recording media such as a flexible disk. Instead of using such a storage medium, the computer program may also be downloaded via a telecommunications line (e.g., through the Internet, for example) and installed in the optical disc drive.

INDUSTRIAL APPLICABILITY

According to the present invention, a method and apparatus for converting a data stream in a format, in which video information and audio information are encoded, into a data stream in a different format without re-encoding the former stream is provided. Since there is no need to perform re-encoding, the processing can be speeded up and the processing load can be lightened. Thus, it is very easy to implement this method even in an apparatus with low processing performance.

The invention claimed is:

1. A method for converting a data stream in a first format into a data stream in a second format, wherein each said data stream includes data packs in which video data and audio data are stored and a control pack for use in a playback control of the data stream, wherein in the data stream in the first format, address information, which represents addresses of the data packs and which is not required while the data stream is played back, is present and associated with the data stream, and wherein in the data stream in the second format, address information, which represents addresses of the data packs and which is required while the data stream is played back, is stored in the control pack, the method comprising the steps of:

acquiring the data stream in the first format and the associated address information thereof;

generating a second control pack in the second format from a first control pack in the first format, the second control pack storing the address information acquired; and replacing the first control pack with the second control pack, thereby generating the data stream in the second format from the data stream in the first format, wherein the data stream in the first format is an arrangement of multiple data units, each of the data units including a plurality of data packs and the first control pack, and wherein the method further comprises the steps of:

locating an extension field, which is included only in a first one of the data packs, in each of second and following data units;

detecting a data length of a stuffing field, which is arranged after the extension field and in which the stuffing data is stored in advance; and determining whether or not the data length detected is a reference length or less, wherein the step of replacing is carried out if the data length is the reference length or less.

2. The format conversion method of claim 1, wherein the data stream in the first format is an arrangement of multiple data units, each of the data units including a plurality of data packs and the first control pack, each said data pack including a packet in which either the video data or the audio data is stored and a padding packet for adjusting a pack length of the data pack, wherein the method further comprises the steps of:

locating an extension field, which is included only in a first one of the data packs, in each of second and following data units;

deleting the extension field; and adjusting a packet length of the padding packet according to a field length of the extension field deleted.

3. The format conversion method of claim 1, wherein the address information is stored in the first control pack of the data stream in the first format, and wherein the step of acquiring the address information includes extracting the address information stored in the first control pack.

4. The format conversion method of claim 3, wherein the step of acquiring the address information includes extracting the address information stored in an attribute information field, on which an arbitrary type of information is describable, within the first control pack.

5. The format conversion method of claim 1, wherein the step of acquiring the address information includes extracting the address information stored in a data file separately from the data stream.

6. The format conversion method of claim 1, wherein the address information shows a storage location of a data pack in which a picture representing the video is stored and a storage location of another data pack in which audio to be reproduced synchronously with the picture is stored.

7. The format conversion method of claim 1, wherein the first one of the data packs corresponds to each of a first one of video packs including video data and that of audio packs including audio data.

8. A method for converting a data stream in a first format into a data stream in a second format,
wherein each said data stream includes data packs in which video data and audio data are stored and a control pack for use in a playback control of the data stream,
wherein in the data stream in the first format, address information, which represents addresses of the data packs and which is not required while the data stream is played back, is present and associated with the data stream, and
wherein in the data stream in the second format, address information, which represents addresses of the data packs and which is required while the data stream is played back, is stored in the control pack,
the method comprising the steps of:
acquiring the data stream in the first format and the associated address information thereof;
generating a second control pack in the second format from a first control pack in the first format, the second control pack storing the address information acquired; and
replacing the first control pack with the second control pack, thereby generating the data stream in the second format from the data stream in the first format,
wherein the data stream in the first format is an arrangement of multiple data units, each of the data units including a plurality of data packs and the first control pack, each said data pack including at least one packet in which either the video data or the audio data is stored, and
wherein the method further comprises the steps of:
locating an extension field, which is included only in a first one of the data packs, in each of second and following data units;
detecting a data length of a stuffing field, which is arranged after the extension field and in which stuffing data is stored in advance;
determining whether or not the data length detected is a reference length or less;
deleting the extension field and the stuffing field if the data length is greater than the reference length; and
adding a padding packet, of which a packet length corresponds to the combined field length of the extension and stuffing fields deleted, to the at least one packet.

9. An apparatus for converting a data stream in a first format into a data stream in a second format,
wherein each said data stream includes data packs in which video data and audio data are stored and a control pack for use in a playback control of the data stream, and
wherein in the data stream in the first format, address information, which represents the addresses of the data packs and which is not required while the data stream is played back, is present and associated with the data stream, and
wherein in the data stream in the second format, address information, which represents the addresses of the data packs and which is required while the data stream is played back, is stored in the control pack,
the apparatus comprising:
a receiving section for acquiring the data stream in the first format and the associated address information thereof; and
a pack generating section for generating a second control pack in the second format from a first control pack in the first format, the second control pack storing the address information acquired, the pack generating section replacing the first control pack with the second control pack, thereby generating the data stream in the second format from the data stream in the first format,
wherein the data stream in the first format is an arrangement of multiple data units, each of the data units including a plurality of data packs and the first control pack, and
wherein the apparatus further comprises:
a decision section for locating an extension field, which is included only in a first one of the data packs, in each of the second and following data units; and
a converting section for replacing data of the located extension field with predetermined stuffing data, and
wherein the decision section detects a data length of a stuffing field, which is arranged after the extension field and in which the stuffing data is stored in advance, and determines whether or not the data length detected is a reference length or less, and wherein if the data length is the reference length or less, the decision section instructs the converting section to make the replacement.

10. The format conversion apparatus of claim 9, wherein the data stream in the first format is an arrangement of multiple data units, each of the data units including a plurality of data packs and the first control pack, each said data pack including at least one packet in which either the video data or the audio data is stored, and
wherein the apparatus further comprises:
a decision section for locating an extension field, which is included only in a first one of the data packs, in each of the second and following data units, detecting the data length of a stuffing field, which is arranged after the extension field and in which stuffing data is stored in advance, and determining whether or not the data length detected is a reference length or less;
a packet generating section for generating a padding packet; and
a converting section for deleting the extension field and the stuffing field if the data length is greater than the reference length, adjusting a packet length of the padding packet according to the combined field length of the extension and stuffing fields deleted, and then adding the padding packet to the at least one packet.

11. The format conversion apparatus of claim 9, wherein the data stream in the first format is an arrangement of multiple data units, each of the data units including a plurality of data packs and the first control pack, each said data pack including a packet in which either the video data or the audio data is stored and a padding packet for adjusting a pack length of the data pack,
wherein the apparatus further comprises:
a decision section for locating an extension field, which is included only in a first one of the data packs, in each of the second and following data units; and
a converting section for deleting the extension field and adjusting a packet length of the padding packet according to a field length of the extension field deleted.

12. The format conversion apparatus of claim 9, wherein the address information is stored in the first control pack of the data stream in the first format, and wherein the pack generating section extracts the address information stored in the first control pack.

13. The format conversion apparatus of claim 12, wherein the pack generating section extracts the address information stored in an attribute information field, on which an arbitrary type of information is describable, within the first control pack.

14. The format conversion apparatus of claim 9, wherein the pack generating section extracts the address information stored in a data file separately from the data stream.

15. The format conversion apparatus of claim 9, wherein the address information shows a storage location of a data pack in which a picture representing the video is stored and a storage location of another data pack in which audio to be reproduced synchronously with the picture is stored.

16. The format conversion apparatus of claim 9, wherein the first one of the data packs corresponds to each of a first one of video packs including video data and that of audio packs including audio data.

17. A computer-readable medium having stored thereon a computer program by a computer used to convert a data stream in a first format into a data stream in a second format,
wherein each said data stream includes data packs in which video data and audio data are stored and a control pack for use in a playback control of the data stream,
wherein in the data stream in the first format, address information, which represents addresses of the data packs and which is not required while the data stream is played back, is present and associated with the data stream, and
wherein in the data stream in the second format, address information, which represents addresses of the data packs and which is required while the data stream is played back, is stored in the control pack,
the program which when executed by the computer causes the computer to perform a processing, the processing comprising the steps of:
acquiring the data stream in the first format and the associated address information thereof;
generating a second control pack in the second format from a first control pack in the first format, the second control pack storing the address information acquired; and
replacing the first control pack with the second control pack, thereby generating the data stream in the second format from the data stream in the first format,
wherein the data stream in the first format is an arrangement of multiple data units, each of the data units including a plurality of data packs and the first control pack, and
wherein the processing further comprises the steps of:
locating an extension field, which is included only in a first one of the data packs, in each of second and following data units;
replacing data of the located extension field with predetermined stuffing data;
detecting a data length of a stuffing field, which is arranged after the extension field and in which the stuffing data is stored in advance; and
determining whether or not the data length detected is a reference length or less,
wherein the step of replacing is carried out if the data length is the reference length or less.

* * * * *